United States Patent
Means et al.

(10) Patent No.: US 10,302,397 B1
(45) Date of Patent: May 28, 2019

(54) DRONE-TARGET HUNTING/SHOOTING SYSTEM

(71) Applicant: DuckDrone, LLC, Half Moon Bay, CA (US)

(72) Inventors: Grady Means, Half Moon Bay, CA (US); Thor Sigvaldason, Washington, DC (US)

(73) Assignee: DuckDrone, LLC, Half Moon Bay, CA (US)

( * ) Notice: Subject to any disclaimer, the term of this patent is extended or adjusted under 35 U.S.C. 154(b) by 0 days.

(21) Appl. No.: 15/787,709

(22) Filed: Oct. 19, 2017

Related U.S. Application Data

(60) Division of application No. 15/454,047, filed on Mar. 9, 2017, now Pat. No. 9,816,783, which is a
(Continued)

(51) Int. Cl.
| | |
|---|---|
| *G09B 19/00* | (2006.01) |
| *F41G 3/26* | (2006.01) |
| *A63F 9/02* | (2006.01) |
| *F41A 33/00* | (2006.01) |
| *G01S 19/14* | (2010.01) |
| *F41J 5/14* | (2006.01) |

(52) U.S. Cl.
CPC ............ *F41G 3/26* (2013.01); *A63F 9/0243* (2013.01); *A63F 9/0252* (2013.01); *F41A 33/00* (2013.01); *F41J 5/14* (2013.01); *G01S 19/14* (2013.01)

(58) Field of Classification Search
CPC ............ F41A 19/58; F41A 17/06; F41G 3/26
See application file for complete search history.

(56) References Cited

U.S. PATENT DOCUMENTS

| | | | | |
|---|---|---|---|---|
| 5,993,215 A | * | 11/1999 | Kotsiopoulos | ........ F41G 3/2605 434/11 |
| 6,166,679 A | * | 12/2000 | Lemelson | ............ G01S 5/0009 342/357.57 |

(Continued)

OTHER PUBLICATIONS

3D Robotics, "About DroneKit," downloaded from URL "http://python.dronekit.io/about/overview.html#api-features," 2015, 2 pages.
(Continued)

*Primary Examiner* — James S. McClellan
*Assistant Examiner* — Kevin M Carter
(74) *Attorney, Agent, or Firm* — Charles Shemwell

(57) ABSTRACT

In a target-shooting simulation system, a master control unit issues flight control instructions to a flight-capable drone to cause the drone to fly along a predetermined flight path and receives GPS coordinates transmitted by a control unit of the drone as the drone flies along the predetermined flight path. The master control unit additionally obtains GPS coordinates, orientation and motion information with respect to a replica firearm, detects actuation of a trigger of the replica firearm and, in response to detecting actuation of the trigger, determines, based on the GPS coordinates of the drone and the GPS coordinates, orientation and motion information with respect to the replica firearm, whether a trajectory of a theoretical shot fired by the replica firearm at time of the trigger actuation will intercept the drone as it flies along the predetermined flight path.

21 Claims, 11 Drawing Sheets

Related U.S. Application Data continuation-in-part of application No. 15/260,844, filed on Sep. 9, 2016, now Pat. No. 9,605,926.

(60) Provisional application No. 62/442,593, filed on Jan. 5, 2017, provisional application No. 62/302,971, filed on Mar. 3, 2016, provisional application No. 62/276,016, filed on Jan. 7, 2016.

(56) References Cited

U.S. PATENT DOCUMENTS

| | | | |
|---|---|---|---|
| 8,777,620 B1 | 7/2014 | Baxter | |
| 8,850,733 B1 * | 10/2014 | Oster | F41A 17/08 |
| | | | 42/70.01 |
| 9,200,870 B1 * | 12/2015 | Theel | F41J 11/00 |
| 2003/0195046 A1 | 10/2003 | Bartsch | |
| 2008/0039962 A1 * | 2/2008 | McRae | F41A 17/06 |
| | | | 700/90 |
| 2008/0233543 A1 * | 9/2008 | Guissin | F41A 33/00 |
| | | | 434/19 |
| 2009/0035730 A1 | 2/2009 | Lindero | |
| 2009/0253103 A1 * | 10/2009 | Hogan, Jr. | F41A 9/61 |
| | | | 434/24 |
| 2011/0092290 A1 | 4/2011 | Huebner et al. | |
| 2011/0311949 A1 | 12/2011 | Preston et al. | |
| 2013/0071815 A1 * | 3/2013 | Hudson | F41G 3/26 |
| | | | 434/19 |
| 2014/0100037 A1 | 4/2014 | Condon et al. | |
| 2015/0241153 A1 * | 8/2015 | Mardirossian | F41A 17/08 |
| | | | 42/70.11 |
| 2015/0276349 A1 * | 10/2015 | Northrup | F41A 33/00 |
| | | | 434/22 |
| 2016/0140851 A1 | 5/2016 | Levy et al. | |
| 2016/0169627 A1 * | 6/2016 | Northrup | F41G 3/2633 |
| | | | 434/22 |
| 2016/0328979 A1 | 11/2016 | Postrel | |

OTHER PUBLICATIONS

3D Robotics, Inc., "3DR Radio V2 Quick Start Guide," Oct. 28, 2013, 4 pages.

3D Robotics, Inc., "PX4FMUv2.4.3 PixHawk Iris Drone Schematics," Feb. 1, 2014, 12 pages.

Amazon.com, "Cabela's Big Game Hunter Hunting Party with Gun—Xbox 360," downloaded from www.amazon.com May 6, 2016, 6 pages.

Bosch, "Data Sheet BNO055 Intelligent 9-axis absolute orientation sensor," Revision 1.2, Nov. 2014, 105 pages.

GlobalTop Technology, Inc., "FGPMMOPA6H GPS Standalone Module Data Sheet," 2011, 37 pages.

* cited by examiner

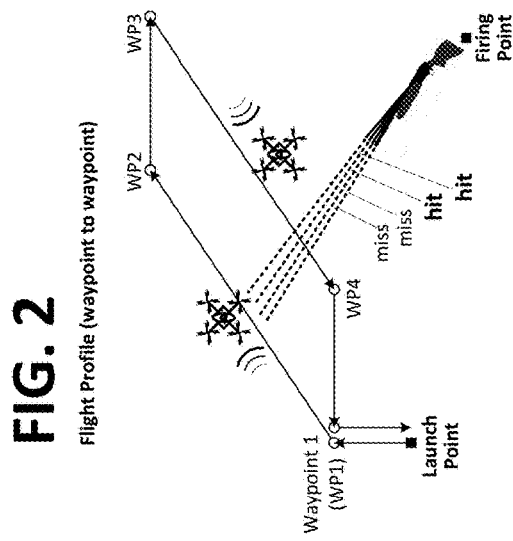
FIG. 2
Flight Profile (waypoint to waypoint)
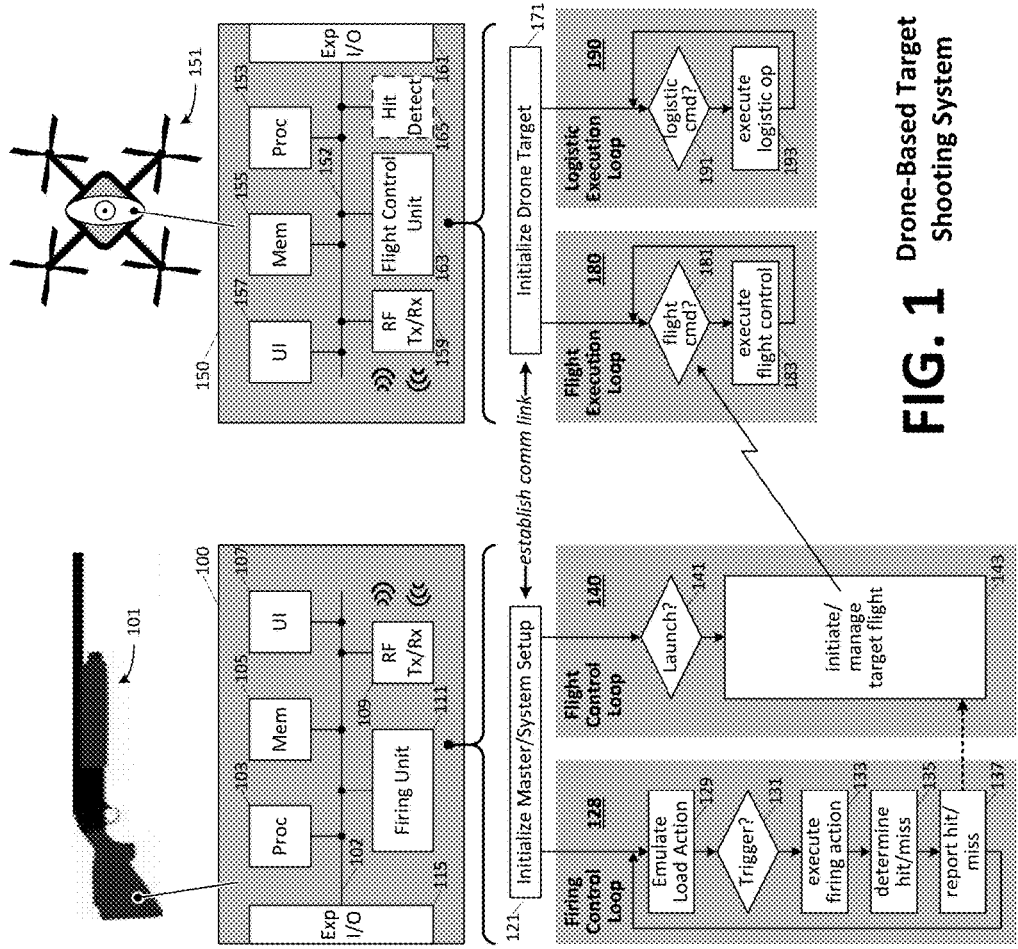
FIG. 1  Drone-Based Target Shooting System

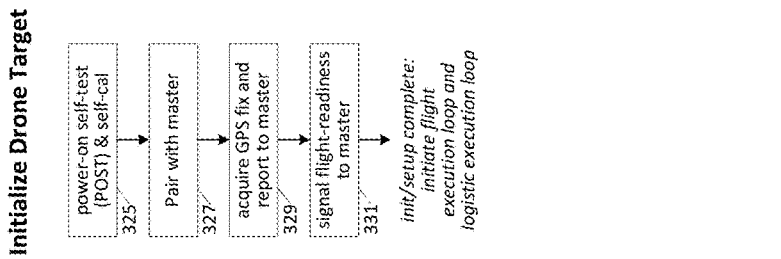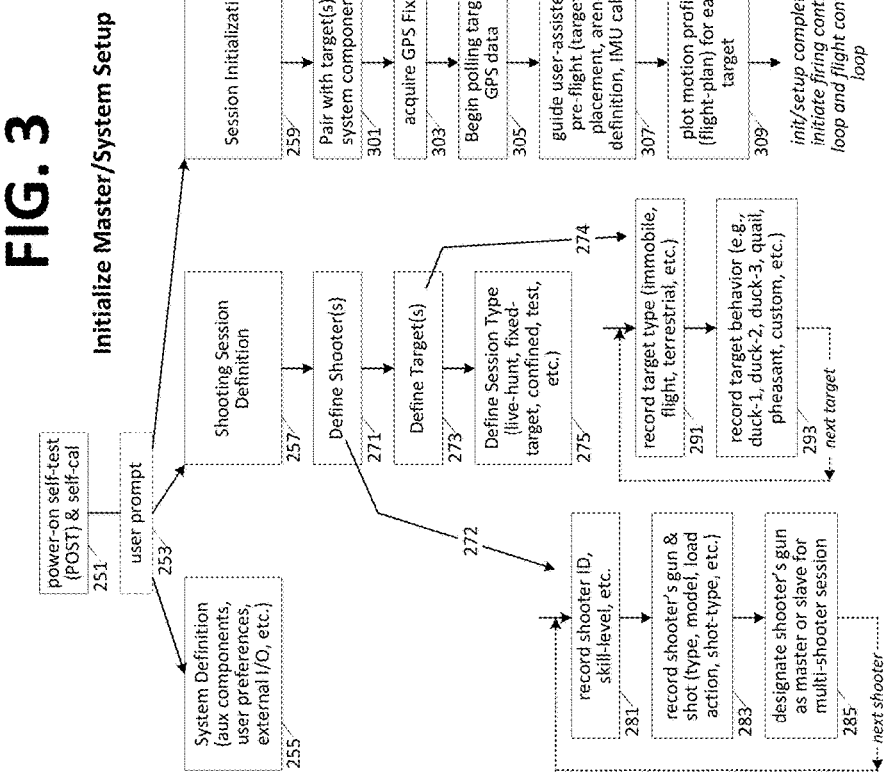

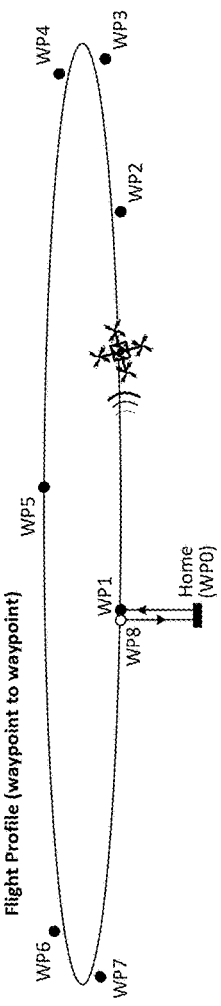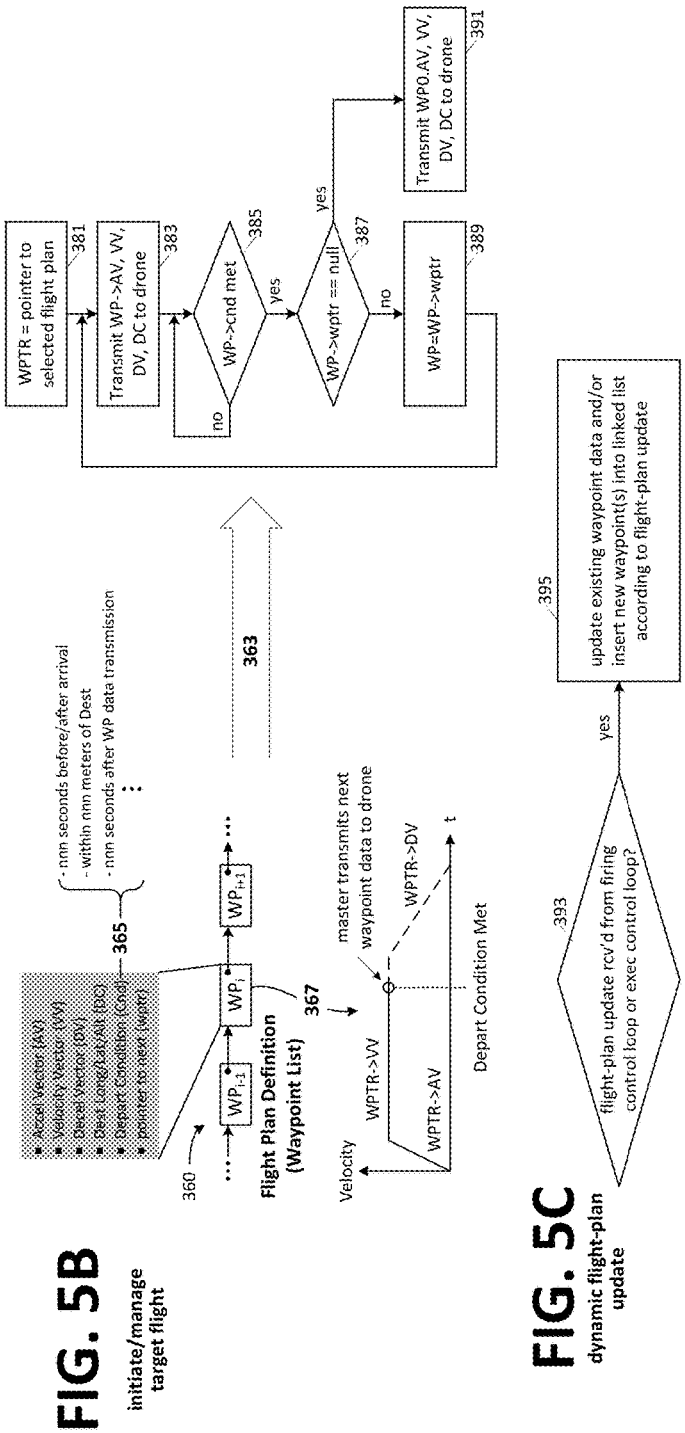
FIG. 5A Flight Profile (waypoint to waypoint)
FIG. 5B initiate/manage target flight
FIG. 5C dynamic flight-plan update

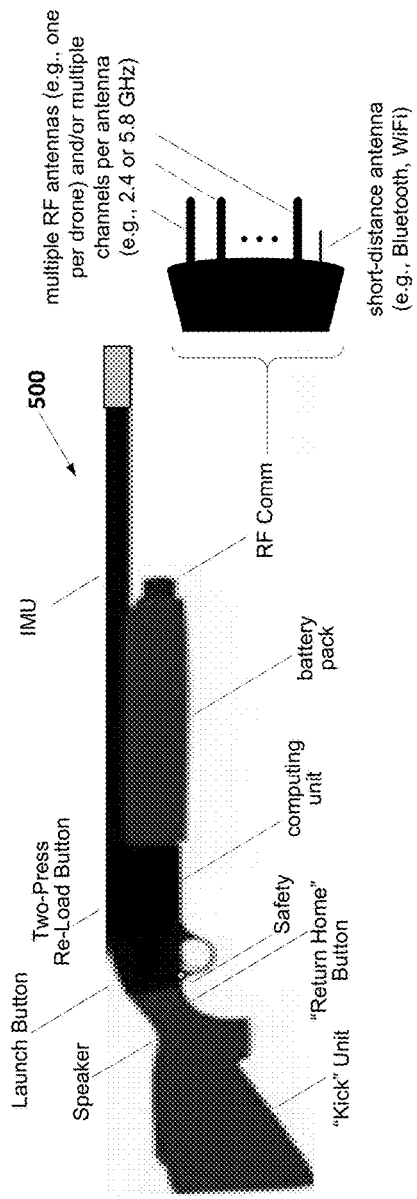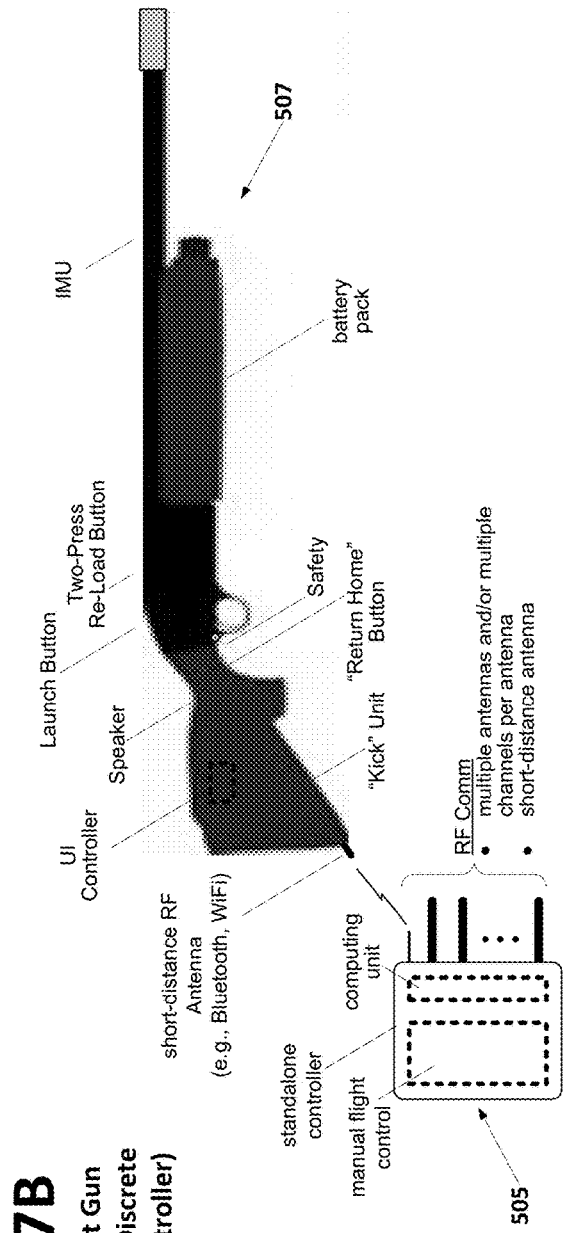
FIG. 7A
Smart Gun
(Integrated System Controller)
FIG. 7B
Component Gun
(Pairs with Discrete System Controller)

Multi-Target

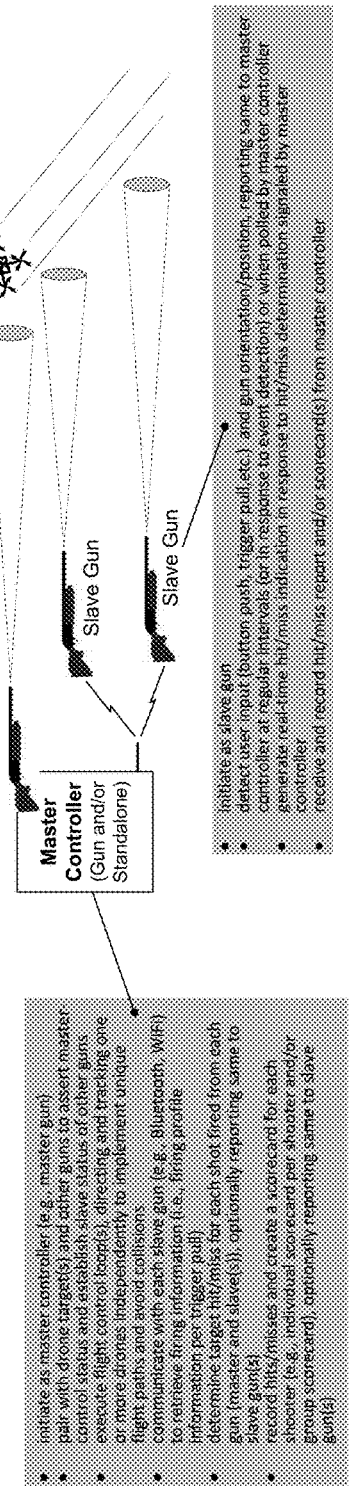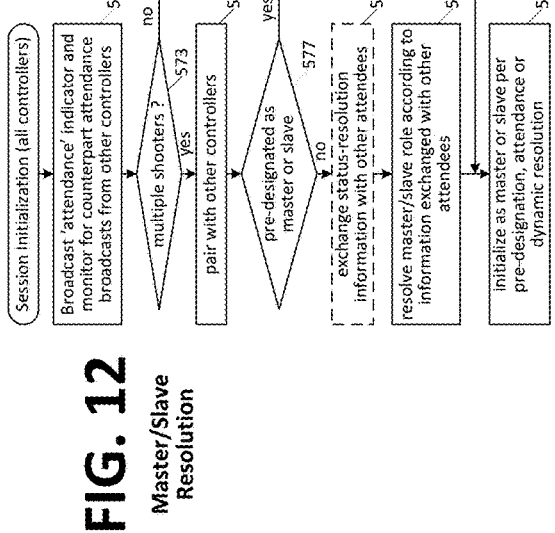

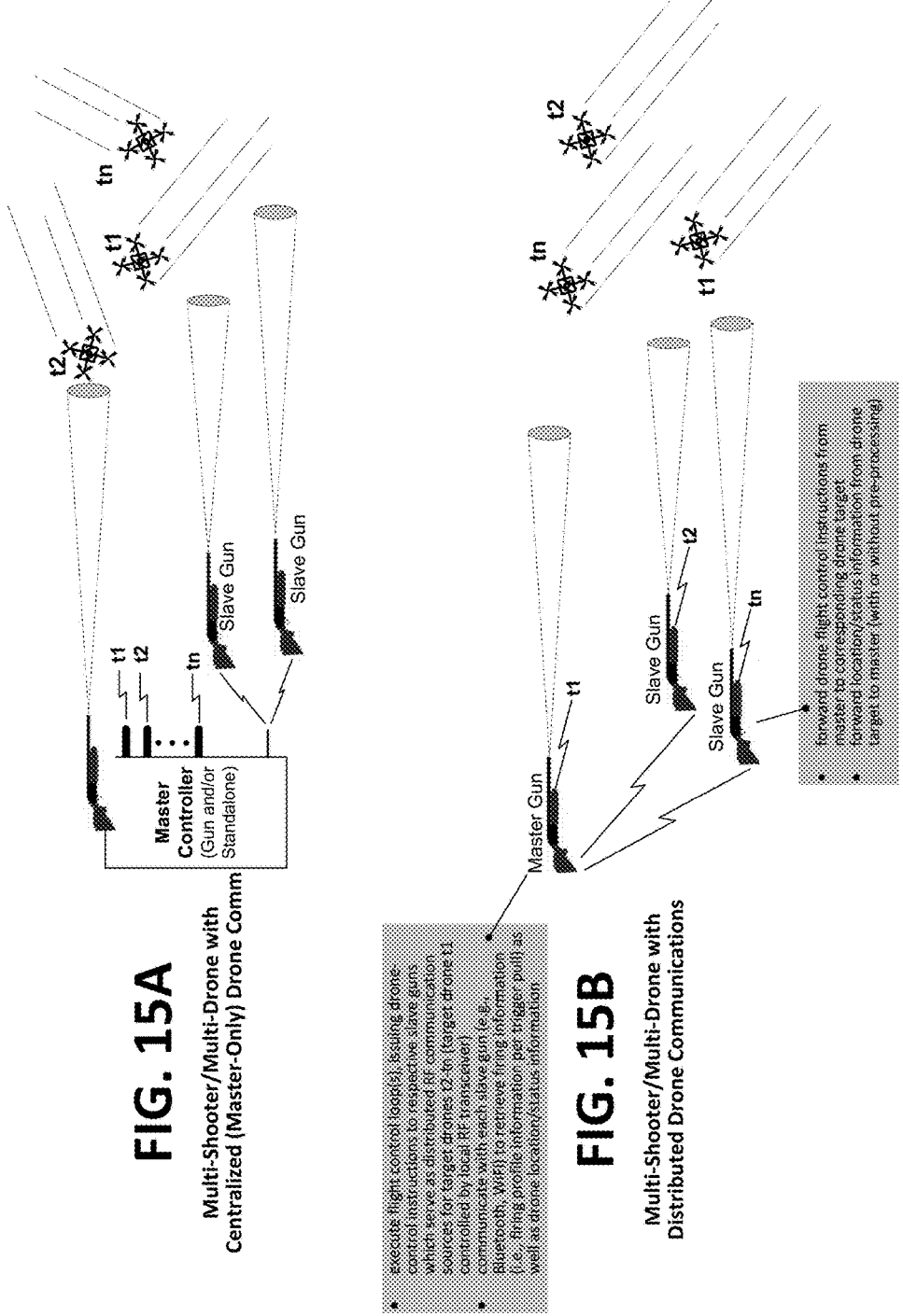

Gun Safety – Safety-Switch Status
and Gun Disposition Detection

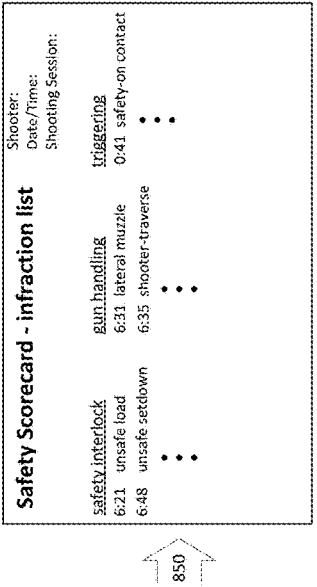
FIG. 16E
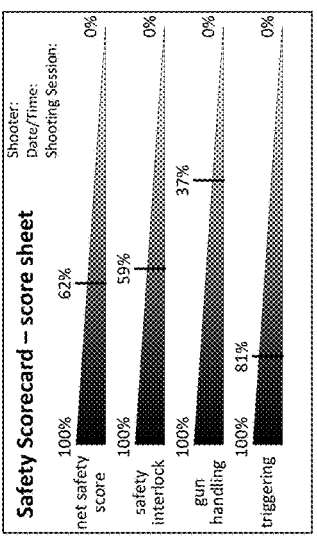
FIG. 17
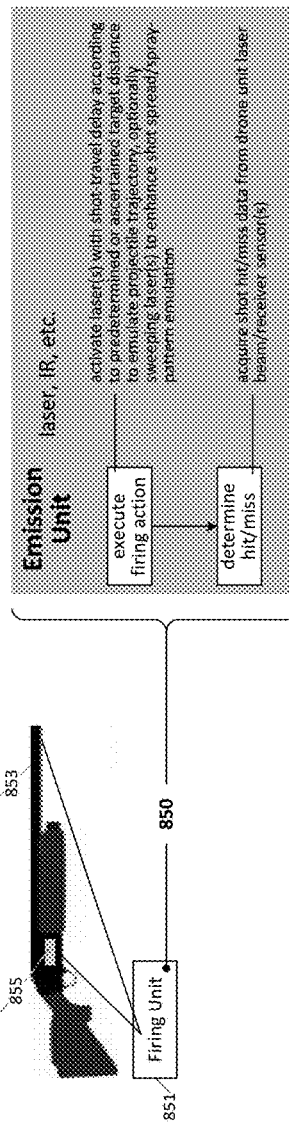
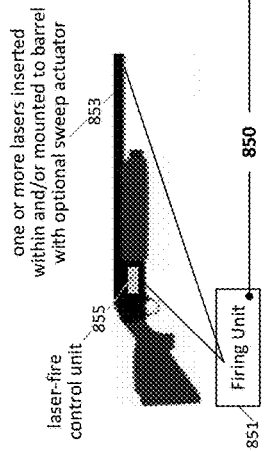
FIG. 18A
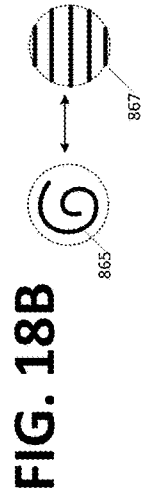
FIG. 18B

DRONE-TARGET HUNTING/SHOOTING SYSTEM

CROSS REFERENCE TO RELATED APPLICATIONS

This application is a division of U.S. application Ser. No. 15/454,047, filed Mar. 9, 2017, which (i) claims the benefit of U.S. Provisional Patent Application No. 62/442,593, filed Jan. 5, 2017, and (ii) is a continuation-in-part of U.S. Nonprovisional patent application Ser. No. 15/260,844, filed Sep. 9, 2016, which claims the benefit of U.S. Provisional Patent Application No. 62/276,016, filed Jan. 7, 2016, and U.S. Provisional Patent Application No. 62/302,971, filed Mar. 3, 2016. Each of the above-identified Patent Applications is hereby incorporated by reference.

TECHNICAL FIELD

The present disclosure relates to target shooting systems.

DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a drone-based target-shooting system;

FIG. 2 illustrates an exemplary target shooting experience enabled by the system of FIG. 1;

FIG. 3 illustrates an exemplary initialization sequence executed by the master control unit of FIG. 1;

FIG. 4 illustrates an exemplary drone target initialization that may be executed by the drone/slave controller of FIG. 1 prior to shooting session commencement;

FIGS. 5A-5C illustrate exemplary waypoint-based flight control and master-slave interaction to carry out same;

FIGS. 7A and 7B illustrate a more detailed embodiments of a replica or imitation firearm including an embodiment having an integrated master controller and an embodiment for which the master controller is implemented separately in a discrete standalone control unit, respectively;

FIG. 11 illustrates an exemplary multi-shooter, single-target shooting session;

FIGS. 12, 13 and 14 illustrate exemplary session start-up actions in a multi-shooter configuration, including dynamic resolution of master/slave controller status (FIG. 12), master controller initialization (FIG. 13) and slave controller initialization (FIG. 14);

FIG. 15A illustrates an exemplary multi-shooter hunting session in which a master controller controls each of multiple drone targets;

FIG. 15B illustrates an alternative embodiment in which the master controller directly controls one or more drone targets through resident communications unit(s), and indirectly controls other drone targets through communication with slave controller intermediaries;

FIG. 16E illustrates an exemplary safety scorecard that reports an overall safety score together with key safety component scores and itemized listing(s) of safety infractions;

FIG. 17 illustrates an embodiment of a drone target-shooting system having an emission-based firing system instead of the virtual firing system (firing emulator) shown in FIG. 6A;

FIG. 18A illustrates an emulated spray/spread of a multi-projectile shot achieved using multiple component lasers within the emission-based firing system of FIG. 16; and FIG. 18B illustrates a pair of exemplary beam-sweep profiles implemented within a laser-beam sweeping mechanism within the emission-based firing system of FIG. 16.

DETAILED DESCRIPTION

Figure 6B:
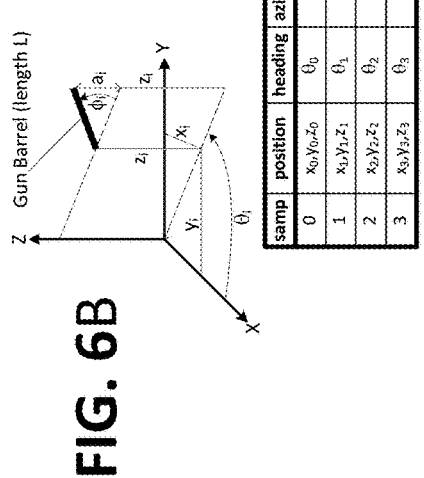
FIGS. 6A-6C illustrate exemplary characteristics and operation of a virtual-gunfire firing emulator implemented within firing unit of the master control unit of FIG. 1.

Simulated gunfire directed to a drone target that follows a predetermined or dynamically controlled motion profile is disclosed herein in various target-shooting/hunting-simulation embodiments. In a number of implementations, for example, a drone target follows a system controlled or pre-programmed flight path that emulates the flight pattern of a duck or other live-fowl hunting target (e.g., quail, pheasant, goose, etc.). As the drone flies, user-controlled firearm action directs simulated or virtual gunshot at the target, with hit/miss data being calculated, sensed or otherwise determined by the system with respect to each shot fired. In contrast to conventional target shooting technologies that use live ammunition to destroy moving targets and/or require operator assistance to launch and, at times, control targets, the various embodiments disclosed herein achieve full realism with the look, feel and apparent action of a real firearm without the danger and cost of live ammunition/target destruction.

Shooting System Overview

FIG. 1 illustrates an embodiment of a drone-based target-shooting system having a master control unit 100 implemented or removably mounted within a replica firearm 101 (e.g., a shotgun, although other replica or imitation firearms may be used or emulated as discussed below) and a slave control unit 150 implemented/mounted within a flight-capable drone 151. As shown, master control unit 100 includes a processing unit 103 (one or more general-purpose and/or special-purpose processors), memory 105 to store data and program code (including non-volatile and volatile memory of any useful type such as flash memory, dynamic random access memory (DRAM), static random access memory (SRAM), etc.), a user-interface 107 (UI), radio-frequency (RF) communication circuitry 109 to enable wireless communications with drone 151 and possibly other devices as discussed below, a firing unit 111 and one or more expansion input/output interfaces 115 (i.e., to enable wired or wireless communication with various expansion devices, networks, etc.) all interconnected via one or more signaling paths (shown conceptually as a single path 102) according to any practicable interconnect topology. Slave control unit 150 similarly includes a processing unit 153, memory 155, user-interface 157 (which, as discussed below, may be limited to one or more buttons/switches/light-elements, etc.), RF communication circuitry 159 and expansion input/output (I/O) interface(s) 161, as well as a flight control unit 163 and optional hit-detect circuitry 165—all interconnected via one or more signaling paths (152).

As their names imply, master control unit 100 and slave control unit 150 operate as master and slave, with each unit executing a respective initialization sequence 121/171 (including establishing a communication link via respective RF communication circuits 109 and 159) and slave control unit 150 (the "slave system" or "drone") thereafter executing commands issued by master control unit 100 (the "master" or "master system"). In the particular embodiment shown, program code within the master control unit is executed in multiple event loops relating to the master's primary functions, including a firing control loop 128 that responds to gun-load and trigger-pull actions of a user, and a flight-control loop 140 that initiates and manages the flight of drone target 151. In firing control loop 128, firing unit 111 (which may be implemented in whole or part through program code execution) emulates the load action of a fire-arm at 129 (e.g., requiring make/break breech loading and or other re-load action following a predetermined number of shots fired), detecting trigger action (131), executing a firing action as discussed below (133), determining a hit or miss with respect to a virtual or simulated shot fired (135) and reporting the hit/miss to the user and/or various other devices or network services as the user may pre-define (137). In flight control loop 140, master control unit 100 responds to a launch directive at 141 (e.g., user button press, voice command or other input indicating that a shooting session is to be commenced) by initiating and managing flight of drone target 150, an operation discussed in greater detail below. Various additional control loops may be executed by the master to provide a non-modal experience to the user (e.g., event loop to receive and respond to user-input at any point in time and thus enable drone flight to be aborted, modified, user-controlled, and/or similar revision to firing control loop actions).

Program code within slave control unit 150 is similarly executed in a number of event loops relating to the drone's primary functions, including a flight-execution loop 180 that responds to flight-related commands from the master control unit (receiving/detecting such commands and executing such commands as shown at 181 and 183, respectively) and a logistic execution loop 190 that responds to requests or commands from the master control unit (191) relating to status (e.g., requesting GPS fix) and/or configuration or operation of one or more logistic components of the host drone 151 (e.g., lights, beacons, audio, haptic, or other elements of the drone UI; one or more GPS-assist features; radio elements, imaging sensors/cameras; etc.), executing such commands at 193. Though not specifically shown, numerous other control loops/processes may also be executed within save control unit 150 (e.g., geofencing to avoid flight outside a particular area, auto-return upon loss of control input, auto-hover-in-place upon loss of GPS fix, etc.).

FIG. 2 illustrates an exemplary target shooting experience enabled by the system of FIG. 1, including an auto-controlled drone flight profile and simulated/virtual gunfire directed at the drone. In the specific example shown, the drone launches from a prescribed or arbitrary launch point (also referred to herein as "home" or "home base") in response to user "launch" input (i.e., received within the master controller and forwarded to the slave controller), and flies to or toward successively received geographical coordinates (e.g., longitude, latitude and altitude), referred to herein as waypoints. Thus, at or before launch, the slave controller receives the geographical coordinates for an initial destination shown as waypoint 1 (WP1) followed or accompanied by flight profile vectors (e.g., acceleration, velocity, deceleration) and responds to the coordinates and flight-profile vectors by issuing control signals (or data) to the flight control unit (e.g., element 163 of FIG. 1, which may be or include a propulsion control unit to direct power to one or more flight engines) to effect drone flight toward the specified waypoint. After or before the drone arrives at waypoint 1, the slave control unit receives (and the master controller transmits) coordinates and flight vectors for waypoint 2 ("WP2 flight data") and issues control signals/data to the flight control unit to propel the drone toward that next waypoint. Similar master/controller transactions are carried out for successive waypoints 3, 4, return-to-1 and then return-to-home to complete the master-controlled drone flight. As discussed below, the flight path may be dynamically altered by the master controller (e.g., causing the drone to drop to a dynamically-inserted waypoint in response to determining that the drone has been hit by virtual or simulated gunshot) and/or by the slave controller (e.g., where input from proximity sensors, vision sensors, operational status sensors or other onboard or remote sensing devices indicates a potential impact or other crash scenario).

Referring to FIGS. 1 and 2, as the drone progresses along the auto-controlled flight path, the firing control loop within master control unit detects gun-load and trigger-pull operation, directing simulated or virtual gunfire at the drone in response to user-actuation of the trigger mechanism ("trigger-pull") of a gun deemed to be loaded and ready for firing; that is "firing the gun" in accordance with firing action 133 of firing control loop 128. At each firing action 133, the master controller determines a gunfire hit or miss (135) based on hit-detect information transmitted from the slave control unit (e.g., obtained from hit detector(s) 165) and/or positional information provided by the slave control unit (e.g., obtained from a global positioning system (GPS) unit within RF circuitry 159 and/or inertial measurement unit (IMU) within flight control unit 163) in combination with firearm position/orientation (e.g., obtained from GPS and/or IMU within firing unit 111 and including derivatives thereof (velocity, acceleration, jerk)). More specifically, in a "virtual-gunfire" implementation of firing unit 111 (also referred to herein as a firing emulator or virtual firing system), firearm position and orientation (including motion thereof) is used to calculate a theoretical gunshot trajectory (including lead, speed and spread of a multi-projectile gunshot such as a shotgun blast) and correlate the theoretical gunshot trajectory with target positioning information to determine a target hit/miss (i.e., whether actual gunshot following the calculated trajectory would impact the target). By contrast, in an "emission" firing unit, a laser beam or other directional radio-frequency beam or emission is generated by the firing unit in response to gun-load/trigger-pull, with trajectory/timing adjustment to account for trajectory/speed differences between the emission and actual gunfire and with hit/miss being determined based on hit-detect sensing within the slave unit (e.g., using one or more laser beam sensing elements within hit detector 165). In either case, hit/miss with respect to each gunshot may be reported (137) in a number of ways and at different times including, without limitation, immediate hit/miss feedback, scorecard reporting and/or scenario playback. Examples of immediate hit/miss feedback include dynamic flight path adjustment (e.g., "drone drop" to effect the appearance of a hit target falling from the sky), audible output from the target and/or firearm unit (e.g., "quack" from a speaker that forms part of the master controller and/or an external I/O to the master controller), activation of visible indicator on target and/or firearm (e.g., LED or other illuminating element one drone target and/or along the sight line of the firearm) and so forth. A post-hunt scorecard may be rendered on a user-interface of the master unit (e.g., on a display element), ancillary device (e.g., paired smartphone) or other computing device (e.g., delivered via wireless network to laptop/tablet/desktop computer or the like, including delivery and automatic or user-controlled posting to one or more social networking sites to enable result sharing, competition, etc.). Scenario playback, which may be viewed as a dynamic scorecard in which the gunshot trajectory and flying target are animated to depict their relative locations in time/space, may similarly be rendered on a user-interface of the master control unit, ancillary device and/or other computing device, thus enabling the user to perceive nuances in projectile dispersion in relation to the moving drone target. In yet other embodiments, the system may provide corrective guidance ("coaching") in the form of immediate or post-hunt auditory and/or visual feedback—for example, audibly or visibly reporting "over-leading" or "under-leading" with respect to a gunshot-miss or sequence of misses that lead or lag the target by a threshold distance, or reporting or otherwise signaling jerk or other sudden change in firearm orientation at (or temporally-near) trigger-pull. The system may also implement dynamic and automatic level-of-difficulty adjustment during or between shooting sessions upon detecting/determining target hit percentages above or below respective thresholds (e.g., making the drone target more or less challenging to hit by implementing more or less complex/agile flight paths, faster or slower flight velocities, acceleration rates, etc.).

Setup and Initialization

FIG. 3 illustrates an exemplary initialization sequence executed by the master control unit of FIG. 1, assuming for purposes of example that the master control unit is integrated or mounted within a replica or imitation firearm and outfitted and/or interconnected with various sensors, including a global positioning system (GPS) system and inertial measurement unit (IMU). At 251, the master control unit ("master") executes a power-on self-test and performs self-calibration with respect to integrated/interconnected sensors. In the event of failure or anomaly detection, the master may notify the user (e.g., via display or other UI element(s)), but otherwise proceeds along one of three control paths to (i) enable user configuration/definition of the target hunting system (255), (ii) enable user configuration/definition of a particular shooting session (257) or (iii) commence a predefined or default shooting session (259). In one embodiment, for example, the user may be prompted at 253 to execute the system definition (255) or session definition (257) or to proceed with session initialization (259), or the system may simply default to session initialization absent user input to the contrary (e.g., hold down particular key or button for two seconds to obtain system/session definition options at 255, 257).

In the system definition path 255, the master controller prompts the user (e.g., via display or other UI elements) to define the target shooting system as a whole including, for example, specifying any auxiliary components that form part of an otherwise base system (e.g., base system is firearm and drone, while auxiliary components may include one or more additional firearms, one or more additional drone targets, one or more additional external sensors, one or more additional computing devices or dedicated flight controllers, etc.). The master controller may additionally prompt the user to specify one or more external devices to which hunting session data is to be transmitted, including various social media sites, messaging services and so forth as discussed below.

In the shooting session definition 257, the master control unit prompts the user to define one or more shooters that will participate in a particular hunting session (271) and also to define one or more targets (273). As shown in detail view 272, shooter definition generally involves recording a shooter profile (281) and firearm characteristics (283). In one embodiment, the master prompts the user to supply, as the shooter profile, a name and/or other individual identifier, skill-level (handicap), preferences, etc. (e.g., prompting the user to select participants from a list of profiles established in the system definition or to define a new participant profile). The firearm characteristics may include, for example and without limitation, the shooter's gun type (e.g., type, model, load action, rifling) and projectile type (shot size, bullet caliber, etc.), thus enabling the firing unit to emulate and enforce the load action (e.g., detect breech load in the case of a breech-loaded shot gun and enabling either two single-barrel shots or one double-barreled shot before requiring re-load) and shot spread characteristics (e.g., according to shot size), projectile spin (rifle shot) and so forth as part of the firing control loop shown in FIG. 1. In alternative embodiments, the master control unit may automatically detect the gun type and characteristics (e.g., sensing the capabilities through wired interconnect or wireless pairing) and thereafter enforce corresponding load action and firing behavior unless overridden by explicit shooter definition. The user may also be prompted to explicitly designate the gun (and thus the controller included therein or associated therewith) as either the master controller or a slave controller (285) for purposes of a multi-shooter hunting session. Alternatively, or if no such explicit master/slave designation is supplied, the controllers within or associated with respective firearms may resolve master and slave status among themselves during the hunting session—either reporting the master/slave status to the participating users (shooters) or making such resolution transparent to users (i.e., unknown to individual users without affirmative investigation). Operation of multiple controllers as master and slave(s) is discussed in greater detail in connection with multi-shooter configurations.

Still referring to FIG. 3, in a target definition (shown for example in detail view 274), the master may prompt the user to specify a target type (291) and behavior (293) for each of any number of drone-based targets. While flight-based targets (e.g., ducks, quail, geese, pheasants, etc.) are presumed with respect to a number of embodiments discussed herein, in all cases, target types may be immobile (e.g., emulating a mounted target like a can or bottle) or terrestrial (bounding deer, rabbit, squirrel, big game, etc.). Similarly, emulated moving targets are not limited to traditional hunting game (i.e., live animals) and may instead be any aerial, ground-based or water-borne targets of interest, including without limitation, aerial, ground-based or water-borne drones, manned vehicles or crafts, or any other moving targets of interest (e.g., in connection with military or police firearm training). At the same time, a commercial toy version of this technology may be developed using smaller toy guns and aerial/ground-based/water-borne moving targets. Moreover, predefined motion profiles (e.g., straight up and then back down, or up, over and down to allow backyard system testing), custom target behaviors and so forth may optionally be selected and/or specified by the user. With regard to target behaviors, various different behaviors of the selected target type may be specified for a given hunting session (including a randomized selection in which any of multiple possible behaviors may be implemented during the hunting session to reduce target predictability). For example, assuming that a duck hunting session is being defined, an open-water takeoff and/or landing behavior may be specified, or a terrestrial takeoff and landing, etc., and various flight patterns—out-and-back, ellipsoid or circular flight pattern, polygonal flight (i.e., straight flights with intervening cornering maneuvers)—may also be selected. Where multiple targets are defined in connection with a given session, the system may permit specification of disparate or flocked/grouped behavior types, including randomization of the differing or flocked behaviors from flight to flight.

After defining shooters and targets, the master may prompt the user to define a shooting session type as shown at 275—in effect, permitting the user to pre-design a shooting experience (e.g., live-target hunt, fixed-target shooting practice, small-area confine (e.g., backyard), test shooting (e.g., up-down flight as discussed above) and so forth), which may then be selected prior to the start of a shooting session. For example, in the evening before a daytime target shoot, the participating shooter(s), target(s) and shooting session may be defined so that, upon arriving at the shooting venue, the pre-defined session may be quickly selected (or implemented by default per the shooting session definition) and commenced, maximizing time spent engaged in the hunting experience. Accordingly, in the exemplary hunting session initialization shown at 259, the master controller pairs with predefined targets and ancillary system components (if any) at 301, acquires a self-GPS fix at 303 (i.e., geo-locating the firearm) and begins polling for drone-target GPS data at 305. Thereafter, the master may guide the user, in accordance with the session-type definition (e.g., live-hunt vs. test) to execute a pre-flight evaluation of the hunting venue (e.g., dimensioning a three-dimensional (3D) box or volume (the "arena") to which the drone-target flight is to be confined), initial placement of the drone target, actions necessary to calibrate sensors (e.g., IMUs) within the replica firearm and/or drone, etc. as shown at 307. After completion of the master-guided pre-flight (the user may carry out any or all of the pre-flight actions/specifications without master guidance in alternative embodiments or system configurations), the master controller plots a flight-plan (or terrestrial motion profile) for each target at 309 to complete the session setup. Assuming at this point, that the drone initializations (shown in FIG. 4 and discussed below) have been executed concurrently with the session initialization shown at 259, the master controller (and peered or slaved replica/imitation firearms in a multi-shooter session) and drone target(s) are ready for shooting session commencement.

FIG. 4 illustrates an exemplary drone target initialization that may be executed by the drone/slave controller prior to shooting session commencement. At 325, the slave controller executes a power-on self-test and optional self-calibration (e.g., confirming operability and calibration of drone communications, sensors and propulsion systems, including GPS). Thereafter, the slave controller pairs with the master controller as shown at 327 (e.g., via wireless communications link having sufficient geographical range to accommodate a planned drone flight) and begins acquiring GPS fix data as shown at 329, reporting the positioning information (e.g., longitude/latitude/altitude) to the master controller volitionally or in response to master-controller request(s). Assuming that self-tests and calibrations complete satisfactorily (including any user-assisted orientation, initial placement on level ground, etc.), the slave controller signals flight-readiness to the master at 331.

Flight Control—Individual Target

FIGS. 5A-5C illustrate exemplary waypoint-based flight control and master-slave interaction to carry out same. Referring first to FIG. 5A, the master controller directs the drone from an initial home location or zero-waypoint (WP0) to or toward a sequence of waypoints to achieve an elliptical drone flight (emulating a circular/elliptical flight of a duck, for example) that concludes with descent from penultimate waypoint 8 (WP8) to the home/starting location—the final waypoint. In alternative embodiments, the waypoints may be changed to achieve virtually any flight pattern, including multiple fly-overs (i.e., of the firing location), various accelerations, velocities, cornering events, trajectories (e.g., taking off and/or landing in a more lateral trajectory to simulate a gradual ascent, space permitting) and so forth.

FIG. 5B illustrates an exemplary flight-plan definition, also referred to herein as a waypoint data list. In the particular implementation shown, the master controller pre-plots the flight-plan as a linked-list 360 of waypoint data objects ($WP_0$, $WP_1$, ..., $WP_{i-1}$, $WP_i$, $WP_{i+1}$, ...) with each such waypoint object including, for example and without limitation, an acceleration vector, velocity vector, deceleration vector, destination coordinate (i.e., geo-positional longitude/latitude/altitude) and departure condition, together with a pointer to a subsequent waypoint object in the list. As shown in the exemplary waypoint object traversal diagram at 363, the master controller initially sets a current-waypoint pointer ("WPTR") to point to a selected flight-plan at 381 (e.g., pointing to the initial home waypoint, WP0, of the flight-plan) and thereafter transmits the acceleration vector, velocity vector, deceleration vector and destination coordinate of the initial waypoint object to the drone at 383 (which acceleration/velocity/deceleration may be null or zero for the WP0 object as the drone is presumably already in the home/WP0 location). Upon determining that the departure condition specified by the waypoint has been met (affirmative determination at 385), the master controller determines whether the final waypoint in the list has been reached (i.e., pointer to next waypoint object is null at 387) and, if so, optionally transmits the homing waypoint object data to the drone at 391 to ensure that the motion profile concludes at the home location. Otherwise, if not the final waypoint, the master proceeds to the next waypoint in the list at 389 and repeats the operations starting at 383.

Still referring to FIG. 5B, the waypoint-object departure condition may be used to institute variable delays (e.g., arbitrary or randomized delay prior to transitioning from WP0 to WP1 to achieve more independent/non-predictable target behavior) and to enable progression from waypoint to waypoint without drone stop at each waypoint destination. Thus, in the example shown at 365, available departure conditions include, without limitation:

timed departure—wait some number 'nnn' of seconds (or more resolute units of time) relative to arrival at the destination specified by the current waypoint pointer before advancing to the next waypoint in the list and transmitting the kinetic/positional data therein to the drone—delay may be set to zero to institute non-delayed departure or to a negative value to institute pre-arrival departure;

proximity departure—advance to the next waypoint object in the list (and transmit the kinetic/positional data therein to the drone) upon determining that the drone position is within a predetermined distance (e.g., 'nnn' meters or more resolute distance units) of the destination specified by the current waypoint object;

command-latent departure—wait some number of seconds after transmission of kinetic/positional data specified by current waypoint pointer before advancing to the next waypoint in the list and transmitting the kinetic/positional data therein to the drone Still referring to FIG. 5B, velocity profile 367 illustrates acceleration and velocity of a drone following transmission of waypoint data, and demonstrates a "fly-through" feature enabled by various possible departure conditions. More specifically, the departure condition corresponding to the current waypoint destination is deemed to be met before the drone arrives at the destination (e.g., by setting a command-latent departure condition, proximity departure condition or even a timed departure with a negative delay time). Accordingly, the master advances to the next waypoint object in the list and transmits the kinetic/destination data therein to the drone while the drone is flying at the velocity specified by the prior waypoint object. Where the newly transmitted velocity vector matches that of the prior waypoint object, for example, the drone may continue flying at the same velocity (speed and direction) to the newly specified destination and thus achieve motional continuity (as opposed to stopping and re-starting at each waypoint). Where the magnitude of the newly transmitted velocity vector matches that of the prior waypoint object, but the direction is changed, a cornering action may be achieved while the speed of the drone remains relatively constant. Thus, in the exemplary flight profile of FIG. 5A, the departure conditions for intermediate waypoints may be specified to yield a continuous (or near continuous) flight speed as the drone progresses past each waypoint. In alternative embodiments, various other navigational constructs may be used to achieve flight continuity (e.g., transmitting a sequence of speed and heading values to the drone instead of or in addition to destination coordinates).

FIG. 5C illustrates a dynamic flight-plan update, implemented within the flight-plan control loop of the master in the context of the waypoint object list of FIG. 5B. As shown, upon receiving a flight-plan update (393) from the firing control loop (e.g., immediate drone-drop in response to target hit) or executive control loop (e.g., abort pre-defined flight-plan and return directly home), the master controller updates one or more existing waypoint data objects and/or inserts one or more new waypoint data objects into the linked list (395) in accordance with the flight plan update. In the case of a drone-drop, for example, the master controller may insert a new waypoint object that specifies the drone-drop location (i.e., a location to which the drone is to descend as if falling after being shot) and another new waypoint object that matches the destination of the current waypoint object (to enable flight to be resumed after drone drop), and then alters the departure condition with respect to the current waypoint object to effect an immediate progression to the drone-drop waypoint. Various other flight-plan modifications may be instituted in response to user input and/or to randomize drone behavior.

Virtual Firing Emulator—Virtual Gunshot and Target Hit/Miss Determination

Figure 6C:
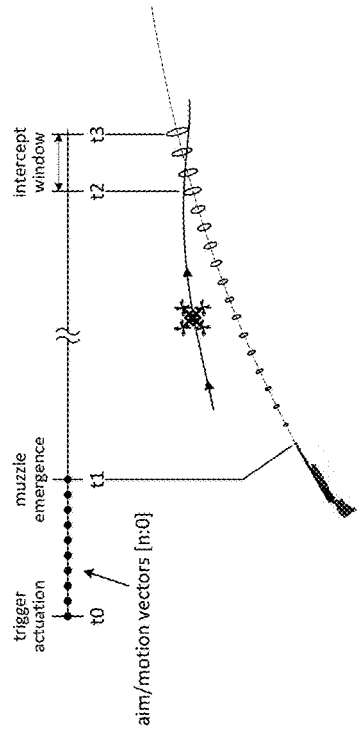
Figure 6A:
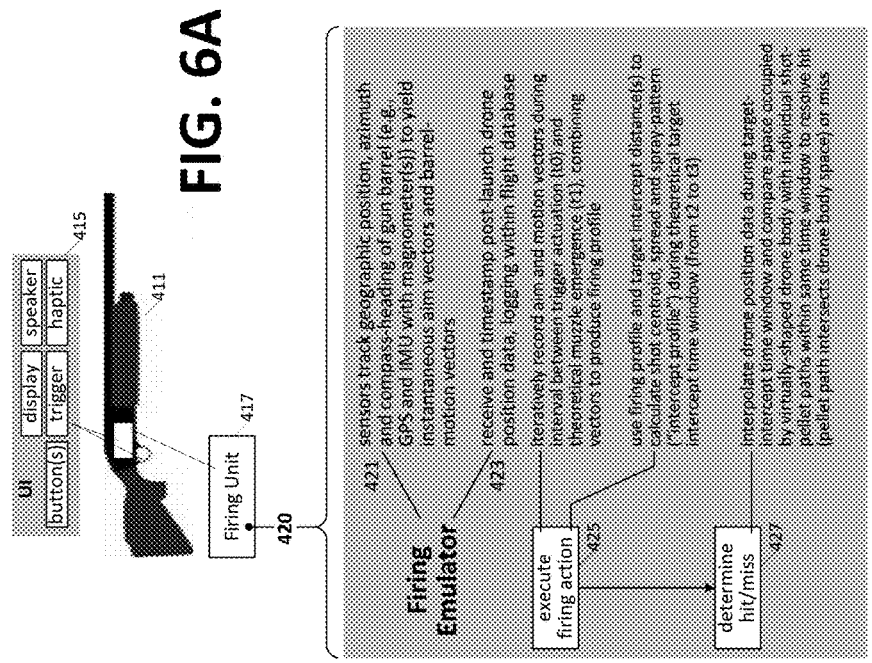

FIGS. 6A-6C illustrate exemplary characteristics and operation of a virtual-gunfire firing emulator 420 implemented within firing unit 417 of the master control unit described above. Referring first to FIG. 6A, the master controller additionally includes a user-interface 415 that includes a display (e.g., LED or LCD display, one or more discrete LEDs, etc.), speaker, one or more buttons (e.g., launch buttons, breech-load detector(s), touchscreen, keypad, etc.), trigger(s) for "firing" the gun, haptic devices (e.g., vibration devices, CO2 kick system and/or any other device to provide haptic feedback to the user) and/or any other device for interacting with a human operator. As discussed above, the master controller and/or replica firearm in which it is integrated 411 (or removably mounted—e.g., as in a smartphone executing a hunting system application and removably mounted into the gunstock of the replica/imitation firearm to connect with auxiliary sensors/UI devices, etc.) additionally includes processing elements, memory of various types, sensors such as IMU and GPS units, communication elements (radios to transmit and/or receive signals, including satellite signals that enable GPS triangulation) and so forth. In general, though shown as a separate component of the master controller in FIGS. 1 and 6A, the firing emulator is instantiated primarily by software execution within the processing unit of the master, with positioning inputs received from local sensors (e.g., IMU, GPS, etc.) and, in some cases supplemented by other geo-positional data inputs (e.g., supplemental geo-positional tracking inputs that enable enhanced positional tracking relative to GPS alone), including drone positioning data received via the communication link discussed above.

Still referring to FIG. 6A, firing emulator 420 responds to trigger actuation of a "loaded" gun by calculating the spatial trajectory of an imaginary gunshot—the "firing action"—in relation to the spatial trajectory of a drone target (or trajectories of multiple drone targets) to determine a gunshot hit/miss. As shown at 421, sensors (IMU, GPS, etc.) within the master controller/firing emulator track the geographic position, azimuth and compass-heading of the barrel of the replica firearm to enable determination of instantaneous aim vectors and barrel-motion vectors—that is, physical position, aim and motion of the gun at the trigger-pull instant. The firing emulator additionally receives and timestamps post-launch drone position data as shown at 423 (e.g. GPS data transmitted by the drone to the master controller in response to pre-programming or fix-by-fix polling by the master), logging the positioning data within a flight database to enable firing-time determination of drone trajectory. FIG. 6B illustrates an example of the motion-vector logging at respective sampling points captured prior to and following the trigger-pull instant (i.e., firing point) to enable determination of the aim and barrel-motion vectors. In the particular example shown, positional data (longitude, latitude, altitude) is logged with respect to the gun (e.g., a particular point or points on the gun, such as gunstock, barrel, muzzle, etc.) together with a compass heading of the gun barrel and azimuth of the gun barrel for each sampling point (e.g., every 5 milliseconds, though higher or lower sampling rates may be employed, including dynamically increased sampling rate following detection of complete or partial trigger pull). Derivatives of the positional data may be calculated to obtain gun barrel velocity, acceleration, jerk, etc. as desirable to accurately calculate the trajectory of a physical gunshot.

Referring now to FIGS. 6A and 6C, upon detecting a trigger-pull (user-input) with respect to a "loaded" firearm, the firing emulator iteratively records gun-aim and barrel-motion vectors during an interval between trigger actuation (t0) and theoretical muzzle emergence (t1), combining the vectors to produce a firing profile that includes the direction of the shot at muzzle emergence together with any velocity and acceleration imparted to the shot due to barrel motion. As shown at 425, the firing emulator uses the firing profile together with a target intercept distance (i.e., distance to target determined using flight-database positioning data) to calculate (i) a theoretical window in time (t2 to t3) at which the drone and gunshot are equidistant from the hunter (i.e., equidistant from the gun muzzle or other fiducial point) referred to herein as the target-intercept window, and (ii) the geo-positional trajectory of a centroid (or one or more foci), spread envelope (which may be a two-dimensional projection or a three dimensional volume) and spray pattern of the shot (i.e., assuming a multi-projectile gunshot as in the case of a shotgun blast) during the target-intercept window—an operation referred to herein as executing the firing action. In one embodiment, the firing emulator interpolates drone positioning data (427) during the target-intercept window (accounting for any acceleration or jerk of the target during that interval—as where the target may be cornering or otherwise changing direction or velocity) and compares the space occupied by a virtually-shaped target body (e.g., a volume or 2D-outline shaped and sized like a duck, goose or other specified target and having a centroid coincident with the drone centroid) with individual projectile (shot-pellet) paths within the target-intercept window to determine whether any or more projectiles within the gunshot would theoretically have hit the virtually-shaped target, resolving an affirmative determination as a hit and a negative determination (with respect to all projectiles within the gunshot) as a miss. In alternative embodiments, particularly where the slave/drone control unit reports GPS fix data at relatively frequent intervals (e.g., at ~100 millisecond intervals, though faster or slower reporting rates may be implemented), drone position interpolation may be coarse or omitted altogether from the hit/miss determination.

Still referring to FIGS. 6A and 6C, it should be noted that the hit/miss determination may be as complex and encompassing as computational power and data gathering capabilities allow, including accounting for the relatively small gravitational effect and applying environmental data bearing on gunshot trajectory (e.g., windspeed/gusts, pressure, temperature, etc.) from sensors integrated within the replica firearm or master controller and/or ancillary system components such as anemometers, thermometers, barometers, etc. Conversely, where constrained by power limitations (battery life) and/or computational capability, the hit/miss determination may be simplified, for example to a two-dimensional projection taken at one or more points in the target-intercept window, determining whether a projection of the gunshot (with simplified spread/spray pattern as necessary) overlays a projection of the drone target. More generally, any calculation or computation that yields a theoretical drone-target hit/miss determination in response to a user trigger-pull may be executed within firing emulator 420.

Firearm and Master Controller—Integrated and Disaggregated Implementations

FIG. 7A illustrates a more detailed embodiment of an integrated-controller replica firearm 500 according to one embodiment, in this case in the form of a replica single-barrel shotgun—rifles, handguns/pistols, or virtually any other replica firearm may be implemented in alternative embodiments. In a number of embodiments, replica firearm 500 is detailed to provide the look and/or feel of an authentic firearm, with blaze orange tip and/or other distinguishing features as necessary to comply with state and federal safety laws. In other embodiments, firearm 500 may be highly stylized (e.g., brightly colored, ornately decorated, "space" gun shaped, etc.) or otherwise non-realistic. Accordingly, all references to "replica firearm" herein should be understood to include a virtual shooting implement ranging from an authentic look/feel fire-arm to a highly stylized product.

Still referring to firearm 500, the "computing unit (control unit or processing function thereof which may serve as a master controller or slave controller in a given shooting session) is housed or removably mounted within the receiver and powered by a battery pack within the magazine (the computing unit may alternatively or additionally be powered by a self-contained battery as where the computing unit is implemented in whole or part by a smart-phone removably mounted in the receiver), and interconnected to: one or more radio-frequency (RF) communications units at the end of the magazine (including a GPS receiver/antenna, one or more drone-control transceivers/antennas, one or more short-distance transceivers/antennas, etc.); one or more inertial measurement units (gyroscopes, accelerometers, compasses, etc.) in the gun barrel; a speaker, abort/return-home button and kick unit in the gunstock; an optional safety button or interlock (located for example, in front of the trigger shroud), and launch and re-load buttons at the top and base of the receiver. In alternative embodiments, one or more the buttons may be combined into a single button with multiple different actuation modes to differentiate alternative functions (i.e., double-press, timed hold-down, etc.) and any of the buttons may require double-press or other safeguard to avoid inadvertent action. More generally, the various buttons and components of the master controller and replica firearm may be implemented in various different ways in alternative embodiments, with any of the components disposed in positions different from those shown in FIG. 7A or, where possible, omitted altogether from the replica firearm as discussed below.

Still referring to FIG. 7A, in one embodiment the radio-frequency (RF) communications units include multiple RF drone-control antennas and transceiver circuits, each to exchange (i.e., transmit and receive) control and status information with a respective one of multiple drones and thereby enable the controller to manage the flights of multiple drone targets simultaneously. In one implementation, for example, replica firearm 500 includes four antennas and counterpart transceiver circuits to enable a single-drone system to be expanded to control as many as four drones (more or fewer drones communication units may be provided in alternative embodiments). In alternative embodiments, a RF communication unit (transceiver and antenna) may be used to control multiple drones, for example, through digital encoding of communications to establish virtual communication links with each of the drones over the same RF carrier. For example, drone-specific digital IDs may be conveyed in packetized communications to and from drones to enable each drone to receive and react to incoming packets bearing a specific ID and ignore others, and likewise to enable the controller to differentiate between transmissions from different drones. In such an embodiment, a local area network (LAN) may be implemented (e.g., according to standard or proprietary protocol) to enable drones to also exchange information with one another for purposes of grouped behavior, collision avoidance, etc. In yet other embodiments, both a multiplicity (M) of RF communication units and multiple virtual channels (N) per RF communications unit may enable a given controller to simultaneously communicate with and control M*N drones, where '*' denotes multiplication.

FIG. 7B illustrates an alternative replica firearm/controller arrangement in which the master controller is implemented within a standalone (discrete) control unit 505 that wirelessly pairs with and responds to input from and optionally controls one or more component (i.e., "dumb") replica or imitation firearms 507. As with the gun-integrated controller of FIG. 7A, standalone master controller 505 includes one or more drone-communication antennas and transceivers as well as one or more short-distance antennas (e.g., according to Bluetooth standard, WiFi standard, etc.) and transceivers for communicating with component firearms (e.g., one or more replica firearms 507 up to a maximum according to the number of shooters that may participate in a shooting session), receiving signals therefrom corresponding to user input (button press, trigger pull, etc.) and gun location/orientation and optionally outputting signals to trigger gun-specific UI action (e.g., speaker output during coaching modes and/or according to user preference). As shown, standalone master controller 505 includes a computing unit (e.g., programmed processor and/or dedicated hardware) to implement the various master-control computing functions described herein. Standalone controller 505 may additionally include a manual flight control interface (e.g., one or more joysticks or other manual flight control input mechanisms) to enable an operator to manually control the flights of any or all drones and thereby facilitate game-play modes in which one or more shooters fire at a drone (or drones) controlled by a human operator (i.e., operator of the manual flight control). The manual flight control may also be used to confirm flight readiness and capability of target drone(s) and/or confirm adherence to or define the shooting-session flight arena. For example, a drone may be manually flown (i.e., flight of drone manually controlled using standalone controller) about the perimeter, ceiling and/or other desired envelope/boundary of the shooting arena to establish those boundaries for subsequent shooting sessions. The boundaries themselves may be determined automatically by the computing unit (e.g., through automatic determination of maximum distances from home base) and/or in response to user-input provided when the drone is positioned at a boundary distance.

While the standalone controller of FIG. 7B is depicted as having integrated processing and RF communications (e.g., as necessary to control one or more drones and communicate with component firearms), in other embodiments, the drone communication antenna(s) may be omitted from the standalone controller and implemented instead in replica firearm(s) 507. In one embodiment for example, each replica/imitation firearm 507 includes a single drone communications antenna to exchange flight-control and positioning information (and possibly other information such as video or still images captured by a drone-borne camera) with one or more drone targets. In such a system, standalone controller may execute flight and firing control loops with respect to one or more drones by communicating with corresponding replica firearms 507, in effect using each replica firearm as a conduit for communicating with a respective target drone or set of target drones—issuing flight instructions and receiving positioning information from the drone(s) via the replica firearm and also receiving the aforementioned user input and firearm position/orientation for purposes of gunshot hit/miss determination.

As with the multiple-antenna drone communication units shown in FIG. 7A, each of one or more drone-control antennas (and counterpart transceiver circuits) within the embodiment of FIG. 7B may implement multiple virtual channels so that a single communications unit (antenna and transceiver) may control and receive status from multiple (N) drones.

In yet other embodiments the standalone controller of FIG. 7B may be implemented in whole or part by a smartphone or other mobile computing device that is separate from the replica firearm and that pairs with one or more components of the replica firearm via a Bluetooth or near-field radio standard to obtain sensor/positioning information and to remotely drive RF communications with the drone (i.e., using the firearm RF communications unit(s) to relay commands from the standalone master controller to the drone and to relay drone status and positioning data to the standalone master controller. In such an embodiment, the smartphone (or laptop, etc.) may pair with multiple wireless transceivers within the replica, or with relay-controlling processor or microcontroller that serves to unify one or more of the otherwise discrete sensors and communication units within the replica firearm (e.g., microcontroller programmed merely to wirelessly relay commands/data between the remote computing device various sensors and communication units of the replica firearm.

Component Pairing, Network Communications

Figure 8:
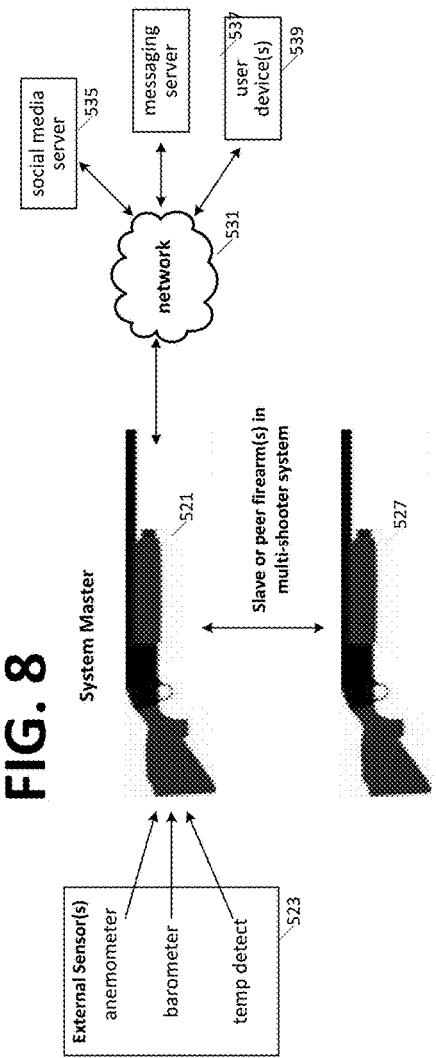
FIG. 8 illustrates an exemplary wireless interconnection of a master control unit of a replica firearm with various auxiliary sensors, peer or slave devices and/or packetized data networks.

FIG. 8 illustrates an exemplary wireless interconnection of a master control unit of a replica firearm with various auxiliary sensors 523, peer or slave devices 527 and/or packetized data networks 531. As shown, auxiliary sensors such as anemometers, barometers, thermometers and so forth may be provided to improve the accuracy of a virtual or simulated firing system and generally add realism to the hunting/target-shooting experience.

Where multiple shooters participate in a target shooting session, one of the replica firearms may operate as the session master (e.g., 521) and thereafter communicate with other replica/imitation firearms (527) to determine shot sequencing, first-to-target calculations, automatic handicapping, combined hit/miss reporting and so forth. In alternative embodiments, two or more replica firearms may participate in a joint target-shooting session as peered devices, communicating according to a predetermined protocol to exchange information for shot sequencing, first-to-target/hit/miss determination, etc. Multi-shooter hunting sessions are discussed in greater detail below.

Still referring to FIG. 8, data gathered during the shooting experience, including the various aim/motion vectors and target trajectory information gathered and/or calculated by the firing system may be recorded along with hit/miss determination (and any information used to resolve hit/miss) or any other information relating to the shooting session (e.g., participants, locations, number of shots fired, number of re-loads, number of target flights, elapsed time or other metric useful for determining monetary amount to be paid for temporary system usage or participation, etc.) may be reported via packetized data network 531 (e.g., Internet) to (i) one or more social media servers 535 (e.g., for automatic posting with respect to a social media platform such as Facebook, Instagram, Twitter, etc.), (ii) one or more messaging servers 537 (e.g., SMS, MMS) to notify the user or other interested/predetermined parties of metered system usage, hit/miss results, etc., and/or (iii) one or more user-devices and/or third-party devices 539 (e.g., smartphone having executable app to display animated hit/miss result), laptop to gather and display statistics regarding shooting session, animate a hit/miss scenario, etc.

Firing Reports/Scorecards

Figure 9:
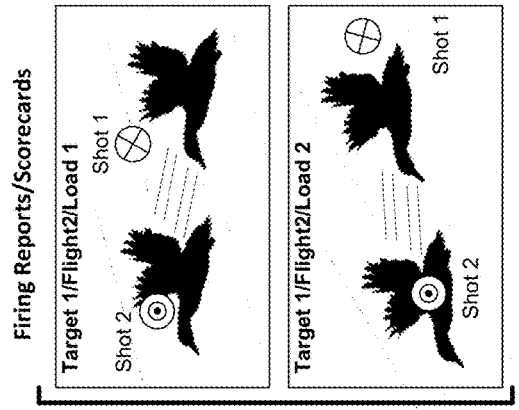
FIG. 9 illustrates an exemplary diagrammatic scorecard showing four shots fired with respect to a drone target flight, including first and second shots following each of two gun-loading events.

As discussed above, a post-shooting-session scorecard, including animated playback, may be rendered on a user-interface of the master controller (e.g., on a display element), ancillary device (e.g., paired smartphone) or other computing device to enable an individual user to assess shooting results and/or promote competition between multiple shooters. FIG. 9 illustrates an exemplary diagrammatic scorecard showing four shots fired with respect to a drone target flight, including first and second shots following each of two gun-loading events. As shown, following the first gun-load, shot 1 missed high and ahead of the drone target (emulating a flying duck in this example), while shot 2 yielded a hit, grazing the duck's right wing. Master controller guidance (i.e., coaching guidance) following the first two shots, may direct the user to lead the target slightly less. After re-load (the second gun load), shot 1 missed behind the drone target while shot 2 was a direct hit. After gathering sufficient data, the shooter's skill level rating may be adjusted up or down, for example, to adjust characteristics of subsequent shooting experiences (e.g., altering drone flight complexity and/or virtual/simulated firearm capabilities), adjust the auto-handicap in a multi-shooter scenario, etc. Alternative scorecard formats, including scorecards showing shots fired by two or more shooters (and/or with respect to two or more targets), animated playback (e.g., showing projectile spread and trajectory in regular or slow motion relative to corresponding trajectory of the drone target) and so forth may similarly be rendered on a user-interface of the master control unit, ancillary device and/or other computing device.

Multiple-Target Hunting/Shooting Session

Figure 10:
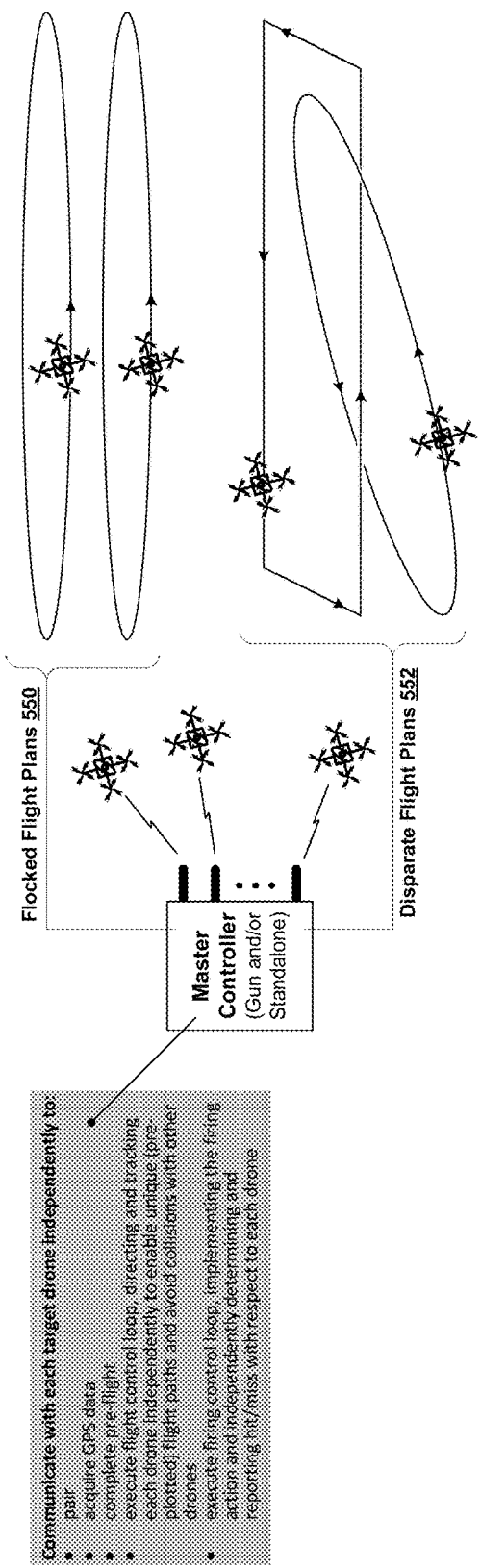
FIG. 10 illustrates an exemplary tracking-flight executed in a multi-target shooting session.

FIG. 10 illustrates an exemplary tracking-flight executed in a multi-target shooting session. As shown, the master controller pairs with each drone target to acquire CPS data, complete pre-flight(s), and execute respective flight control loops (one per drone according to pre-plotting or dynamic path determination) and firing control loops. Two or more drone targets may be instructed to fly essentially the same "flocked" flight plan as shown at 550, with individual flight paths being spatially offset from the other for collision avoidance (e.g., slightly below the other, although other offsets may be implemented, including temporal offsets in which one drone flies behind the other, or combinations of spatial and temporal offsets). Two or more drones may alternatively follow disparate or randomized flight plans as shown at 552, with the individual paths plotted or dynamically updated to avoid collision (e.g., no flight within predetermined proximity of actual or projected location of another drone). More generally, multi-target flights may include any combination of flocked and disparate flight plans (e.g., flying together briefly then scattering) as well as evasive/reactive maneuvers (e.g., responding to gunshot or launch/proximity of other drone targets) and behavioral modes (e.g., "whack-a-mole" mode where a new target is launched as a first concludes its flight or is "shot" out of the air). In a number of multi-target embodiments, the master controller plots the flight paths of respective targets according to a selected target behavior and to avoid collision or other flight interference. In other embodiments, the drone targets themselves may include proximity sensors and logic (e.g., executed program code) to implement automatic collision avoidance (i.e., dynamically revise flight direction to avoid collision) and/or supplement collision avoidance schemes implemented by the master controller.

Multiple-Shooter Hunting/Shooting Session

FIG. 11 illustrates an exemplary multi-shooter, single-target shooting session. As shown, one of the controllers, which may be integrated within a gun or a standalone device, initiates as the master controller and proceeds to pair with drone targets and other "slave" guns (i.e., asserting master control status and establishing slave status of other guns). Thereafter, the master controller executes pre-plotted or dynamic flight control loops, directing and tracking the flight of the drone target. As the drone flies, the master controller communicates with each slave gun (e.g., via Bluetooth, WiFi or other short-range wireless communication) to retrieve firing information (e.g., firing profile information for each trigger pull as described above). The master controller determines target hit/miss for each fired from each gun (again, using the firing profile and drone-trajectory information as discussed above), recording hits and misses and generating a scorecard for each shooter and optionally reporting the scorecards to the controllers of the slave guns and/or other paired devices (e.g., smartphones of individual shooters). The master controller may also generate and report a group scorecard, showing, for example, shots fired by all shooters in a single report and hit/miss status of same (including information as discussed above regarding distance between target and shot (error magnitude) in the case of miss, and well as multiple hits, would-be hits (e.g., where a shot would have hit the target but for target deviation from flight path in response to hit by another target), etc.

Still referring to FIG. 11, each gun resolved not to be the master gun (i.e., master controller) initiates as a slave gun, performs power-on self-tests and thereafter responds to master control commands and requests for status. The slave controller monitors and manages local input/output components of the host gun (e.g., inertial-measurement unit and/or other onboard sensors, and user-input (UI) elements such as trigger, buttons, kick-unit or other haptic feedback, speaker, lights, etc.), reporting UI events and sensor measurements to the master controller in response to detected events, at regular intervals and/or when polled. The slave controller may implement user-notification actions (e.g., speaker noise, kick action, indicator light) in response to internal determinations and/or when instructed to do so by the master controller. The slave controller may also receive and record (and/or display) hit/miss report or scorecard information received from the master controller.

Still referring to FIG. 11, in a number of embodiments, all guns are identical or nominally identical (i.e., fungible or otherwise interchangeable) and thus each have an on-board or associated controller as well as antennas and supporting RF circuitry. Upon system initialization, one gun is resolved (e.g., dynamically or by predetermination or ad-hoc designation) as the master gun and the remainders as slave guns. Slave guns may disable component systems (or processing actions) that are to be implemented exclusively within the master gun including, for example and without limitations, RF circuits provided for drone communications that are unneeded in a given shooting session (i.e., because the number of drone targets may be controlled exclusively via master-gun drone-communication circuitry). In other embodiments, slave guns may be less full-featured than the master gun. For example, one or more slave guns may lack drone communication circuitry altogether and thus rely solely on another fully-featured gun to provide system mastership.

FIGS. 12, 13 and 14 illustrate exemplary session start-up actions in a multi-shooter configuration, including dynamic resolution of master/slave controller status (FIG. 12), master controller initialization (FIG. 13) and slave controller initialization (FIG. 14). Starting with FIG. 12, as the controller integrated within (or associated with) the gun ("replica firearm" or "imitation firearm") for each participating shooter powers up, the controller broadcasts an "attendance" indicator at 571 and monitors the spectrum for counterpart attendance broadcasts from other controllers. If multiple guns (multiple shooters) are to participate in the shooting session, each controller will detect an attendance broadcast from at least one other controller and thus make an affirmative determination at 573. In that multi-shooter case, each controller pairs with other controllers at 575 and, if not pre-designated as a master or slave controller (negative determination at 577) optionally exchange status-resolution information with other controllers at 579 and then resolve the controller role as either a master controller or slave controller at 581 according to information or other exchanged with other controllers (i.e., status-resolution information exchanged at 579 and/or information included in attendance broadcast). In one embodiment, for example, master/slave status is arbitrated according to relative values of identifiers conveyed in attendance broadcast or other exchange (e.g., lowest or highest IP address, Bluetooth address, serial number, etc.), first to broadcast attendance or other information (e.g., according to timestamp included in broadcast), controller reporting strongest drone-communication signal (e.g., highest average signal-to-noise ratio, highest average signal amplitude, etc.) or any other information that may reliably be used to resolve master and slave roles among the participating controllers. However master and slave status is determined (i.e., resolved dynamically at 581 or pre-designated as denoted by affirmative determination at 577), each controller initializes according to its master or slave role at 583—operations shown, for example, in FIGS. 13 and 14, respectively.

FIG. 13 illustrates an exemplary initialization sequence for a controller resolved or pre-designated as the master controller in a given shooting session. If multiple shooters are present (a determination made at 591 according to detection of attendance broadcasts from one or more other controllers as discussed above), the master controller broadcasts its master status to other controllers at 593 and optionally acknowledges incoming slave-status transmissions from those controllers. At 595 the master controller pairs with target drones and any peripheral components (including slave guns) and then, at 597, begins acquiring local gun disposition (e.g., location and orientation information, user-input detection, etc.). At 599 the master controller begins acquiring location information from the drone targets (e.g., GPS data) and at 601 the master begins acquiring disposition of remote guns, if present. At 603 the master controller conducts guided pre-flight actions (e.g., as discussed above) and then plots target flight plans at 605. At this point, setup is complete and the master controller awaits launch input from the user before executing firing control loops and flight control loops for paired guns and drone targets.

In the exemplary slave controller initialization shown in FIG. 14, each slave controller transmits its slave status to the master controller at 621 in response to receiving a master-status broadcast (i.e., asserting mastership) from the master controller. Thereafter, at 623, the slave controller begins acquiring local gun disposition and transmitting that information to the master—operations that may be initiated internally (volitionally) within the slave controller or in response to instruction (polling) from the master controller. In an embodiment in which one or more drone-communications units within the slave gun (or standalone slave controller) are to be used to control drone targets, the slave controller may relay master-transmitted flight commands to the drone targets and returns drone location information to the master controller as shown at 625—that is, the slave controller and corresponding drone communication units serve as an intermediary (middle-man) between the master controller and selected drones, forwarding communications in both directions.

FIG. 15A illustrates an exemplary multi-shooter hunting session in which a master controller controls each of multiple ('n') drone targets (t1-tn). As shown, the master controller may be integrated within a master gun or implemented as a standalone controller, and includes one or more RF communication units that enable communication with the drone targets and slave guns/controllers.

FIG. 15B illustrates an alternative embodiment in which the master controller (shown as being integrated within a "master" gun in this case, though a standalone controller implementation may be used instead) directly controls one or more drone targets (t1) through resident communications unit(s), and indirectly controls other drone targets (t2-tn) through communication with slave controller intermediaries. Under this arrangement, multiple communications units within the overall shooting system are distributed among multiple replica firearms, thus reducing the drone communications requirements for individual guns. As discussed above, instead of each gun (or controller) having a single-drone communications unit (i.e., such that N guns communicate with N respective drones), each gun/controller may include communication circuitry capable of controlling up to M drone targets so that the overall system enables simultaneous control (flight control) over M*N drone targets. In either case, the master controller executes flight control loops each drone target (even those for which slave controller communication units are used to transmit flight control information and receive drone disposition information) and executes firing control loops for each slave gun. Conversely, the slave guns forward drone flight control instructions from the master controller to respective drone target(s) and forward location/status information from the drone target to the master. In some cases, the slave controller may perform some information processing with respect to drone status information (e.g., generating interpolated positioning information or other pre-processing to lower the processing load of the master controller). The slave controller may similarly pre-process gun disposition information prior to transmission to the master controller.

Gun-Safety Scoring and Coaching

Figure 16A:
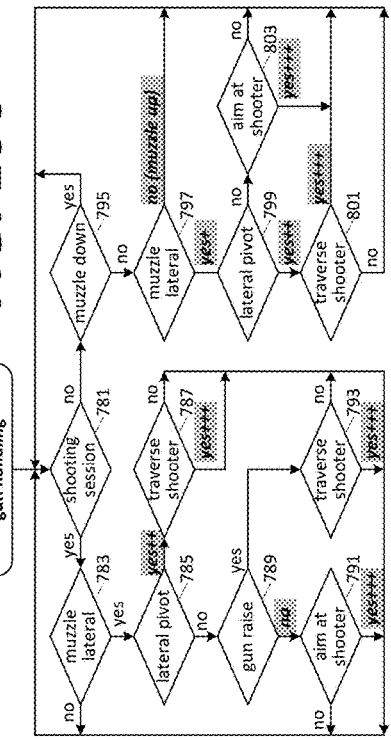
FIGS. 16A-16D illustrate examples of gun disposition, safety-switch status, and trigger contact detection that may be carried out to generate a safety scorecard for a given shooter, constrain shooter actions and/or generate real-time coaching feedback.

The provision of a firearm safety switch and various sensors for determining gun orientation/location for purposes of firing emulation enable real-time determination of adherence to gun safety principles and thus the opportunity to encourage and teach gun safety through safety scoring (i.e., detecting and reporting safety infractions of various degrees) and real-time safety coaching. Moreover, user safety preferences may be specified in connection with the shooter and firearm definitions discussed in reference to FIG. 3, including applying different levels of safety requirements for younger or less experienced shooters and/or for more challenging firearms, allowing specification of infraction weighting (severity-weighting) according to user safety viewpoint and/or particular behaviors to be encouraged, enable/disable audible or other real-time coaching operation (e.g., through audible, haptic or other feedback), control and specify impact of safety infractions on the marksmanship scorecard of one or more (or all participating) shooters, etc. In general, options may be provided for reinforcing a number of longstanding safety principles regarding safety-switch actuation, gun handling and triggering, including for example and without limitation:

firearm's safety switch should be on (i.e., in the "safe" or disarmed position) whenever a shooting session is not active or imminent and whenever the firearm is being loaded or unloaded regardless of safety-switch and ammunition-load status, a firearm should be handled at all times as though loaded and ready to fire a firearm should be handled in a safe "muzzle down" orientation during transport and when a shooting session is not ongoing or imminent (i.e., muzzle never pointed at anything other than an intended target)

fingers should be kept off the trigger until the muzzle is up and the shooter is sighting a target FIGS. 16A-16D illustrate examples of gun disposition, safety-switch status, and trigger contact detection that may be carried out to generate a safety scorecard for a given shooter, constrain shooter actions (e.g., disallowing gun load while safety off) and/or generate real-time coaching feedback. FIG. 16A illustrates exemplary muzzle orientation angles that may be detected by the inertial measurement unit (IMU) within a replica/imitation firearm and that, together with safety switch status and GPS input (indicative of gun transport) may be used to detect and report various safety infractions. For purposes of example, an aerial-target shooting session is assumed so that, in general, when the muzzle is pointed down by a predetermined (or user-specified) angle relative to vertical or horizontal (e.g., 75° down or more from a 0° horizontal), the muzzle is deemed to be aimed in a "muzzle down" safe position corresponding to the depicted safety cone. By contrast, when the muzzle is pointed up by a predetermined angle ("muzzle up"), the firearm is in a target shooting orientation corresponding to the depicted shooting cone. Note that the muzzle-up and muzzle-down angles need not have the same magnitude (though their signs relative to the horizontal will be opposite) and may be varied according to the type of hunting/shooting session to be engaged and/or firearm type.

Figure 16C:
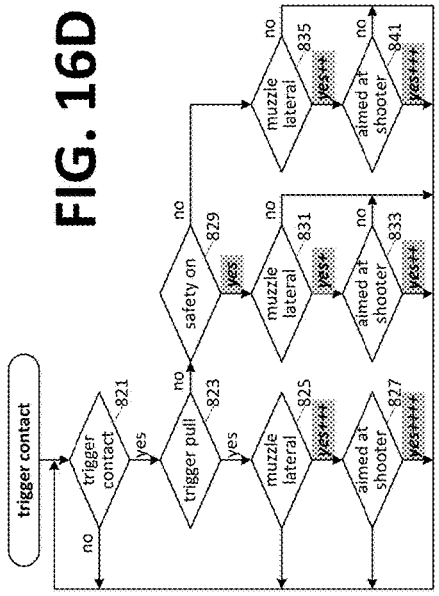
Figure 16B:
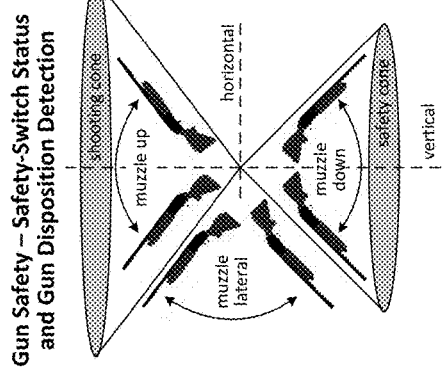

FIG. 16B illustrates an exemplary safety-switch status check that may be carried out by the control unit within or associated with a replica/imitation firearm (e.g., standalone or embedded master controller and/or slave controller). In general, the status check may be repeated at regular intervals (e.g., every 20 milliseconds) or as often as practicable in view of processing bandwidth and begins with evaluation of the safety switch status at 751. If the safety is on (e.g., switch discussed above in reference to FIGS. 7A and 7B is in the trigger-interlock or other engaged position), the status check is deemed complete and processing ends until the next status-check iteration. Otherwise, if the safety is off (negative determination at 751), then GPS data is evaluated at 753 to determine whether the gun is being transported (e.g., user walking, running or riding with the gun). If the gun is being transported with the safety off, the unsafe transport detection is recorded and safety score updated according to a predetermined or user-specified weighting of the safety-off transport infraction at 755 (e.g., score decremented by predetermined or user-specified number of points). Similarly, if a shooting session is not ongoing or imminent (e.g., safety off and shooting session not engaged or commenced within predetermined time of safety-off detection), a negative determination at 757, then the shooter's failure to engage the safety is recorded at 759 (again, updating the safety score according to the infraction weighting). Continuing, if a gun load or unload action is detected at 761 while the safety is off, or the gun is unhanded (i.e., set down as determined by relative steadiness of signals from IMU and/or other sensors and shown at 765) corresponding safety infractions are recorded at 763 and 767, respectively and the safety score is updated. Various other safety switch-related infractions may be recorded and/or used to modify the safety score and/or marksmanship score of a given user in alternative embodiments or according to user preferences. With respect to any and/all such infractions, the firearm may provide coaching (e.g., rendering an audible, haptic and/or other message or signal) to the individual responsible for the firearm pointing out the infraction and/or specifying remedial action (e.g., playing a message that "the gun has been unhanded with the safety off" or other like message for other infractions).

FIG. 16C illustrates an exemplary gun-orientation safety evaluation executed by the control unit within or associated with a replica/imitation firearm to further refine the safety score, marksmanship score and/or provide coaching. Starting at 781, the controller distinguishes between gun orientation during a shooting session and idle periods (no shooting session underway or imminent). During a shooting session (affirmative determination at 781), if the muzzle is in a lateral position, (affirmative determination at 783), then the controller evaluates sequentially generated orientation data (i.e., IMU output captured over a given interval) to determine whether the firearm is being pivoted/swept through the lateral orientation—a dangerous motion as the firearm may be directed to nearby persons and/or terrestrial structures. If the firearm is being pivoted through a lateral muzzle orientation (affirmative determination at 785), an infraction is recorded, safety score updated and optional coaching provided. As an aside, infractions are denoted within FIG. 16C (and also 16D) by shading of a decision outcome (yes or no), with one or more '+' symbol to indicate a relative weighting of the infraction (i.e., "yes+++" is a greater infraction than "yes+"). In actual implementation, relative infraction weightings may vary from those shown and may be recorded numerically to facilitate generation of a final safety score).

Continuing with FIG. 16C, if the later pivot is determined to traverse one or more other shooters at 787 (i.e., aim sweeps through a probable position/location of one or more other shooters (human beings) as determined by GPS coordinates and/or other sensor information reported to the master controller with respect to the guns of other shooters—a severe infraction portending a hunting accident in a live-ammunition hunt), a targeting infraction is recorded. Returning to the lateral muzzle orientation detected at 783, if no lateral pivot is detected (negative determination at 785), then a sensor information is evaluated at 789 to determine if the shooter is raising the gun—a generally permissible action during a shooting session so long as the vertical pivot does not traverse a shooter. Accordingly, if a gun raise is detected at 789 and the pivot is determined to traverse a shooter (affirmative determination at 793), a targeting in fraction is recorded as shown. If no gun raise is detected at 789, then the gun is deemed to be statically oriented in a lateral-muzzle position (i.e., gun is not being pivoted laterally or vertically), an unsafe orientation for which an infraction is recorded (i.e., as indicated by the shaded "no"). If the static aim of the gun is directed at or dangerously near another shooter (affirmative determination at 791), an additional infraction (i.e., targeting infraction) is recorded as shown.

Still referring to FIG. 16C, if no shooting session is underway (negative determination at 781) and the muzzle orientation is evaluated at 795 and 797 to determine whether the muzzle is pointed down (safe—no infraction), laterally (unsafe—infraction recorded for affirmative determination at 797) or up (unsafe but less so than for lateral muzzle orientation—infraction recorded for negative determination at 797). If the muzzle is oriented laterally, then sensor input is evaluated at 799 to determine whether a lateral pivot is underway. If so (affirmative determination at 799), an infraction is recorded to mark the shooter's highly unsafe gun handling, followed by recordation of enhanced infraction (targeting infraction) if the pivot is deemed to traverse another shooter (i.e., affirmative determination at 801 that muzzle is aimed at the probable location of another shooter as the gun pivots). If lateral pivot is not detected at 799, the firearm is deemed to be statically oriented in the lateral position and an enhanced infraction (targeting infraction) is recorded upon determination at 803 that the muzzle is aimed at another shooter.

Figure 16D:
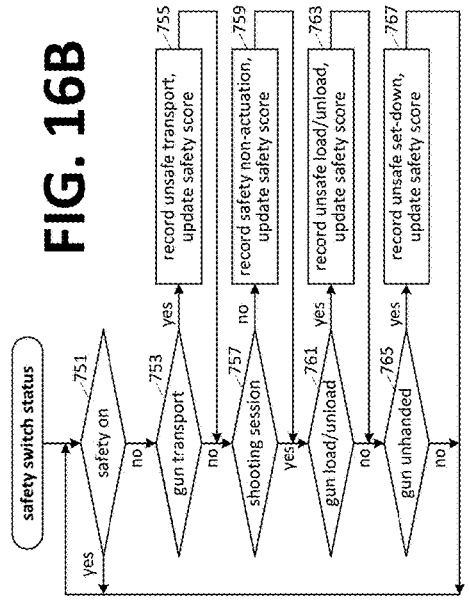

FIG. 16D illustrates an exemplary trigger-contact safety evaluation sequence executed by the control unit within or associated with a replica/imitation firearm to further refine the safety score, marksmanship score and/or provide coaching. At 821, sensors associated with or that form part of the firearm's trigger mechanism (e.g., pressure sensors or switches, capacitive sensors, temperature sensors, etc.) are evaluated to determine whether the shooter's finger(s) are in contact with the trigger—generally in connection with the principle that the shooter's fingers should not be on the trigger unless the safety is off and the muzzle is up. Accordingly, if trigger contact is detected at 821, but no trigger pull (negative determination at 823) and the safety is on (affirmative determination at 829), a trigger-contact infraction is recorded, followed by determination of the muzzle orientation. A lateral orientation detected at 831 results in recording a further infraction, and muzzle orientated toward another shooter (e.g., probable location of another shooter as indicated, for example, by GPS or other location information received from a replica/imitation firearm borne by that shooter) results in a yet further infraction recording (targeting infraction, but with safety on). If the safety is not on (negative determination at 829), then detection of a lateral muzzle orientation at 835 produces an even greater infraction penalty and aim at another shooter (841) causes an even more severe infraction to be recorded (targeting infraction with safety off).

Reflecting on FIGS. 16B-16D, the scoring impact and reporting of various safety infractions may vary according to user preferences. In one embodiment, shown for example in FIG. 16E, a finalized safety score is generated with each infraction resulting in a deduction—that is, the shooter starts with a "perfect" score that is reduced according to the number and severity of recorded infractions. In the depicted embodiment, for instance, the scorecard reports an overall or "net" safety score, together with underlying scores for key safety metrics (e.g., safety-interlock usage, gun handling, and triggering, to name a few). The scorecard may also tally/list itemized infractions and their respective times of occurrence relative to shooting session commencement or system power-up (e.g., as shown at 850) to enable a shooter to understand and mitigate or avoid particular actions/behaviors/circumstances that constitute or lead to unsafe actions. More generally, the various safety infractions and manner of their detection shown in FIGS. 16B, 16C and 16D are exemplary only—various other types of infractions or behavior may be monitored, reported, encouraged/discouraged, etc. in alternative embodiments or configurations. Moreover, the safety scorecard may also or alternatively be integrated with a marksmanship hit/miss scorecard (e.g., a scorecard having both marksmanship and safety components) and/or the safety score may be combined with the marksmanship score to generate an overall shooter performance score—in all cases with either default or user-specified infraction weighting.

Simulated Firing Emulator—Laser or Other Emissive Firing System

FIG. 17 illustrates an embodiment of a drone target-shooting system having an emission-based firing system 850 implemented within firing unit 851 of the master control unit instead of the virtual firing system (firing emulator) shown in FIG. 6A. In the depicted example, firing unit 851 includes one or more lasers 853 (or other beam or directed-RF emission units) and a laser-control unit 855 that operates the laser(s) in a manner that emulates the speed, lead and/or spread of a shotgun blast or other multi-projectile shot. One or more light-sensitive detectors/targets (e.g., as shown by hit detect unit 165 of FIG. 1) are secured to or integrated within the drone target and generate "hit" detection signals in response to laser-beam impingement to enable the slave control unit to record and report target "hit" events. Thus, firing unit 851 emits one or more laser beams and the slave control unit records hit events with respect to the emitted beams, reporting hits to the master control unit as they occur (e.g., automatically in response to each such hit detection) and/or when queried by the master control unit.

In a number of embodiments, laser-fire control unit 855 (which may be a sub-function or sub-component of the master control unit) activates laser(s) 853 in a manner that emulates the speed, lead and spray/spread of multi-projectile gunfire (e.g., shotgun blast). In one embodiment, for example, laser-fire control unit 855 implements a delay between trigger pull and laser beam emission to account for the vastly different speeds of laser beam travel and gunshot speed (the latter being, for example, on the order of 1150 feet per second for a 12-gauge shotgun blast), thus projecting the laser beam(s) into the target locale at a time that approximates projectile travel delay. Similarly, to account for the "swing" and "lead" of a hunter's gun (i.e., to place the gunshot properly ahead of a moving target) in view of the much faster laser beam travel, laser-fire control unit 855 (and/or drone detector/target) are designed to yield a "hit" if the drone target is properly led. In one embodiment, for example, the laser-beam detector shape and placement and/or laser beam orientation with respect to the gun barrel are designed to register a laser hit in response to a shot fired "ahead of the drone" to account for lead. For both the speed-compensating delay and the lead, the laser-fire control unit (or other component of the master control unit) may ascertain the distance to the drone (e.g., determined according to replica-firearm position and the drone's position at or near the time of the gunshot) and or use an estimated or predetermined distance (e.g., calculated and/or looked up according to an expected location of the drone along its flight path, a fixed predetermined distance according to the shooting session definition, etc.), applying that distance (or distances) in the delay time determination and/or lead determination.

To emulate the spray/spread of a multi-projectile shot, laser unit 853 may include multiple component lasers (i.e., to generate multiple laser beams simultaneously) as shown in FIG. 18A (five component lasers generate five laser beams that disperse over distance) and/or a mechanism to sweep the one or more laser beams through a firing path that corresponds to the expected (calculated or predetermined) shot spread, thus emulating a spray pattern. FIG. 18B illustrates two possible beam-sweep profiles, including a single laser spiral profile 865 within a spread envelope (dashed outline) and a multiple beam rake profile 867 within the same spread envelope, various other sweep profiles and combinations of sweep profiles (e.g., multiple spirals) may be implemented in alternative embodiments, and any practical mechanism for sweeping or dispersing the laser beam(s) may be used (e.g., actuating mechanism to physically rotate/translate the laser source through a profile, actuating mechanism to physically rotate/translate an optical component (prism, mirror, etc.) to effect the beam-sweep profile, etc.). As in the case of an emulated firing action (rather than laser beam emission), the emulated spray pattern may vary in accordance with motion of the gun (velocity, acceleration, jerk) as detected by an IMU or other sensor(s) within the control unit.

Any of the various methodologies disclosed herein and/or user interfaces for configuring and managing same may be implemented by machine execution of one or more sequences instructions (including related data necessary for proper instruction execution) with such instructions recorded on one or more computer-readable media for later retrieval and execution within the processing unit(s) of the master and/or slave controllers discussed above or, where appropriate, within remote computing devices (e.g., wirelessly paired computing devices such as a smartphone operating as a master controller, or networked computing devices). Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific communication protocols, interconnect topologies, motion profiles, sensors, component elements and the like can be different from those described above in alternative embodiments. The term "coupled" is used herein to express a direct connection as well as a connection through one or more intervening functional components or structures. Device configuration or programming can include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A simulation system comprising:
    an imitation firearm having a firing trigger, one or more sensors that indicate an orientation of the imitation firearm while borne by a user, a user-interface mechanism, a safety interlock, and a safety-interlock circuit to indicate whether the safety interlock is engaged to render the imitation firearm into a disarmed state or disengaged to render the imitation firearm into an armed state; and
    a control unit to (i) determine, at respective instances in time, whether the orientation of the imitation firearm indicated by the one or more sensors falls within a range of unsafe dispositions concurrently with indication by the safety-interlock circuit that the safety interlock is disengaged (ii) alert the user via the user-interface mechanism of each affirmative determination regardless of whether the user attempts to pull the firing trigger, (iii) tally each affirmative determination as a respective safety violation, (iv) and generate a quantitative firearm-safety score for the user based at least in part on the tally of safety violations.

2. The simulation system of claim 1 wherein the range of unsafe dispositions comprise a predetermined angular range.

3. The simulation system of claim 1 wherein the user-interface mechanism comprises at least one of an audio mechanism to generate an audible output, a light-emitting mechanism to generate a visible output or a haptic mechanism to generate a haptic output.

4. The simulation system of claim 2 wherein the control unit to determine whether the orientation of the imitation firearm falls within the range of unsafe dispositions comprises logic to ascertain whether the orientation of the imitation firearm falls within the predetermined angular range concurrently with indication from the safety-interlock circuit that the safety interlock is disengaged.

5. The simulation system of claim 1 wherein the imitation firearm comprises a sensor circuit that signals actuation of the firing trigger to the control unit.

6. The simulation system of claim 5 wherein the control unit is further to determine whether the orientation of the imitation firearm falls within the range of unsafe dispositions concurrently with a signal from the sensor circuit indicating actuation of the firing trigger.

7. The simulation system of claim 1 wherein the control unit comprises a communication unit to receive information indicative of a probable location of a human being other than the user bearing the imitation firearm, and wherein the control unit to determine whether the orientation of the imitation firearm falls within the range of unsafe dispositions comprises logic to ascertain whether the imitation firearm is aimed at the probable location of the human being.

8. The simulation system of claim 7 wherein the imitation firearm constitutes a first imitation firearm and wherein the communication unit to receive information indicative of the probable location of the human being comprises a radio communication unit to receive location information from a second imitation firearm presumed to be borne by the human being.

9. The simulation system of claim 8 wherein the radio communication unit to receive location information from the second imitation firearm presumed to be borne by the human being comprises logic to receive information indicating that the second imitation firearm is in motion.

10. The simulation system of claim 1 wherein the control unit to generate the numeric fire-arm safety score comprises circuitry to generate a marksmanship score that is dependent on both the tally of safety violations and marksmanship data.

11. The simulation system of claim 10 wherein the control unit is mounted within the imitation firearm.

12. A method of firearm safety training within a shooting simulation system in which a user bears an imitation firearm having a control unit, a firing trigger, one or more sensors, a user-interface mechanism, a safety interlock and a safety-interlock circuit, the method comprising:
- determining, within the control unit and at respective instances in time, whether an orientation of the imitation firearm indicated by the one or more sensors falls within a range of unsafe dispositions concurrently with indication by the safety-interlock circuit that the safety interlock is disengaged to render the imitation firearm into an armed state;
- alerting the user of each affirmative determination via the user-interface mechanism regardless of whether the user attempts to pull the firing trigger;
- tallying each affirmative determination as a respective safety violation; and
- generating a quantitative firearm-safety score for the user based at least in part on the tally of safety violations.

13. The method of claim 12 wherein determining whether the orientation of the imitation firearm falls within the range of unsafe dispositions comprises determining whether the orientation of the imitation firearm falls within the predetermined angular range.

14. The method of claim 12 wherein alerting the user of each affirmative determination via the user-interface mechanism comprises generating at least one of an audible alert, a visible alert or a haptic alert.

15. The method of claim 12 wherein the imitation firearm comprises a sensor circuit that signals actuation of the firing trigger to the control unit, the method further comprising determining whether the orientation of the imitation firearm falls within the range of unsafe dispositions concurrently with a signal from the sensor circuit indicating actuation of the firing trigger.

16. The method of claim 12 further comprising receiving within the control unit information indicative of a probable location of a human being other than the user bearing the imitation firearm, and wherein determining whether the orientation of the imitation firearm falls within the range of unsafe dispositions comprises determining whether the imitation firearm is aimed at the probable location of the human being.

17. The method of claim 16 wherein the imitation firearm constitutes a first imitation firearm, and wherein receiving the information indicative of the probable location of the human being comprises receiving via a radio communication unit location information from a second imitation firearm presumed to be borne by the human being.

18. The method of claim 17 wherein receiving the location information from the second imitation firearm comprises receiving information indicating that the second imitation firearm is in motion.

19. The method of claim 12 wherein generating the quantitative firearm-safety score for the user based at least in part on the tally of safety violations comprises generating a marksmanship score that is dependent on both the tally of safety violations and marksmanship data.

20. The method of claim 19 wherein generating the quantitative firearm-safety score for the user based at least in part on the tally of safety violations comprises generating a user-viewable safety report that includes, for each tallied safety violation, information descriptive of the safety violation and an adjustment to a numeric safety score due to the safety violation.

21. A simulation system comprising:
- an imitation firearm having a firing trigger, one or more sensors that indicate an orientation of the imitation firearm while borne by a user, a user-interface mechanism, a safety interlock, and a safety-interlock circuit to indicate whether the safety interlock is engaged to render the imitation firearm into a disarmed state or disengaged to render the imitation firearm into an armed state; and
- means for (i) determining, at respective instances in time, whether an orientation of the imitation firearm indicated by the one or more sensors falls within a range of unsafe dispositions, (ii) alerting the user via the user-interface mechanism of each affirmative determination regardless of whether the user attempts to pull the firing trigger, (iii) tallying each affirmative determination to the user as a respective safety violation, and (iv) generating a quantitative firearm-safety score for the user based at least in part on the tally of safety violations.

* * * * *